(12) United States Patent
Von Essen et al.

(10) Patent No.: US 11,364,664 B2
(45) Date of Patent: Jun. 21, 2022

(54) METHOD AND A DEVICE FOR FORMING A DROPLET OR DROPLETS ONTO A FIBRE

(71) Applicant: FIBROBOTICS OY, Tampere (FI)

(72) Inventors: Mathias Von Essen, Tampere (FI); Matti Hautala, Tampere (FI); Pasi Kallio, Tampere (FI)

(73) Assignee: FIBROBOTICS OY, Tampere (FI)

( * ) Notice: Subject to any disclaimer, the term of this patent is extended or adjusted under 35 U.S.C. 154(b) by 123 days.

(21) Appl. No.: 16/619,247

(22) PCT Filed: Jun. 9, 2017

(86) PCT No.: PCT/FI2017/050431
§ 371 (c)(1),
(2) Date: Dec. 4, 2019

(87) PCT Pub. No.: WO2018/224723
PCT Pub. Date: Dec. 13, 2018

(65) Prior Publication Data
US 2020/0122364 A1 Apr. 23, 2020

(51) Int. Cl.
| | |
|---|---|
| *B05D 1/00* | (2006.01) |
| *B29C 41/00* | (2006.01) |
| *B29C 41/14* | (2006.01) |
| *B29C 41/52* | (2006.01) |
| *G01N 19/04* | (2006.01) |

(52) U.S. Cl.
CPC ............ *B29C 41/003* (2013.01); *B05D 1/00* (2013.01); *B29C 41/14* (2013.01); *B29C 41/52* (2013.01); *G01N 19/04* (2013.01)

(58) Field of Classification Search
CPC ....................................................... B05D 1/00
See application file for complete search history.

(56) References Cited

U.S. PATENT DOCUMENTS

2006/0164468 A1 * 7/2006 Yoda .................... B41J 2/14233
347/71
2014/0154089 A1 * 6/2014 Traser ..................... C09J 7/385
156/60

FOREIGN PATENT DOCUMENTS

WO    WO 2016/153508    9/2016

OTHER PUBLICATIONS

International Search Report, PCT/FI2017/050431, dated Feb. 19, 2018.
(Continued)

*Primary Examiner* — Hai Y Zhang
(74) *Attorney, Agent, or Firm* — Nixon & Vanderhye

(57) ABSTRACT

A method for forming at least a first primary droplet onto a primary fiber includes arranging part of the primary fiber into a reserve of liquid or viscous polymer based material so the primary fiber extends through and on both sides of the reserve. The primary fiber and/or the reserve move relative to each other so a first part of the primary fiber moves out from the reserve with a first primary velocity, forming a first primary layer of the liquid or viscous polymer based material onto the first part of the primary fiber. The first primary layer of the liquid or viscous polymer based material is allowed to form a first primary droplet onto the primary fiber holding the primary fiber relative to the reserve or moving the primary fiber and/or the reserve relative to each other with a first secondary velocity less than the first primary velocity.

19 Claims, 13 Drawing Sheets

(56) References Cited

OTHER PUBLICATIONS

Zhang Xuan-Yu et al: "Point-by-Point Dip Coated Long-Period Gratings in Microfibers",IEEE Photonics Technology Letters, IEEE Service Center, Piscataway, NJ, US, vol. 26, No. 24, Dec. 15, 2014 (Dec. 15, 2014), pp. 2503-2506, XP011565064, ISSN: 1041-1135, DOI:10.1109/LPT.2014.2359546 [retrieved on Nov. 21, 2014] II. Experiments; figure 1, III. Result and discussions, first paragraph; figure 2.

David Quere: "Fluid Coating on a Fiber",Annual Review of Fluid Mechanics, Jan. 1, 1999 (Jan. 1, 1999), pp. 347-384, XP055450308,4139 El Camino Way, P.O. Box 10139, DOI: 10.1146/annurev.fluid.31.1.347 Retrieved from the Internet: URL:http://www.annualreviews.org/doi/pdf/10.1146/annurev.fluid.31.1.347 p. 350, line 20-p. 351, line 7; figure 3 p. 360, line 30-p. 361, line 8; figure 7, 6.2 Annular Films Flowing; 6.3 Pearls and Drops; figures 15, 16 p. 379, lines 35-38.

P. Saketi et al: "A flexible microrobotic platform for handling microscale specimens of fibrous materials for microscopic studies: Microrobotic Platform for Handling Microscale Specimens", Journal of Microscopy, vo 1. 248, No. 2, Oct. 19, 2012 (Oct. 19, 2012), pp. 163-171, XP055450469, GB ISSN: 0022-2720, DOI: 10.1111/j.1365-2818.2012.03660.x Design and implementation, pp. 164-166; figures 2, 3, 4 Making individual paper fibre bonds, p. 169.

Shin et al., "Interfacial and Wetting Properties Between Glass Fiber and Epoxy Resins With Different Pot Lifes", http://doi.org/10.101016/j.colsurfa.2018.02.017, Colloids and Surfaces A.

Zhikharev et al., "Delaminations and Ultrasound Assisted Repoar of Ballistically Loaded GFRP", 20Tth International Conference on Composite Materials Copenhagen, Jul. 1-24, 2015.

Gennes et al., restricting the velocity to low values (more rigorously, the requirements is Ca1/3<<1, which is more restrictive.

* cited by examiner

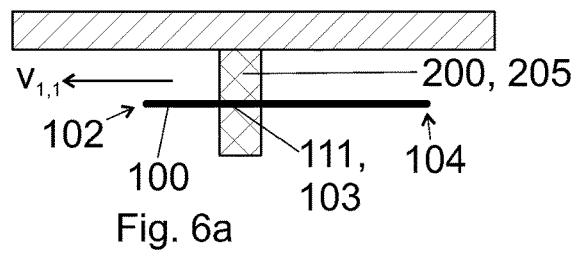
Fig. 6a
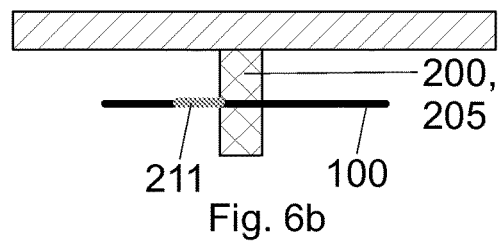
Fig. 6b
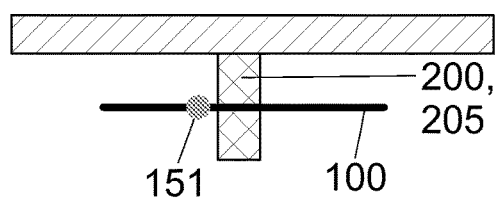
Fig. 6c
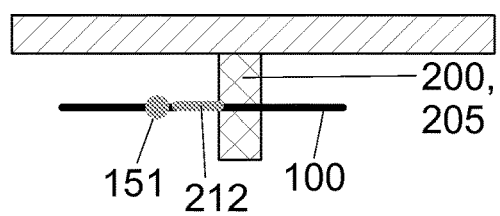
Fig. 6d
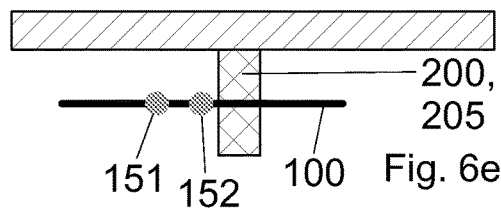
Fig. 6e
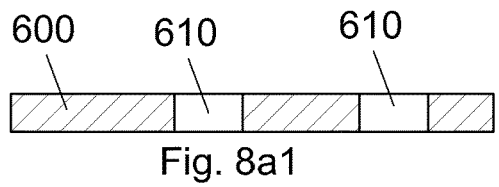
Fig. 8a1
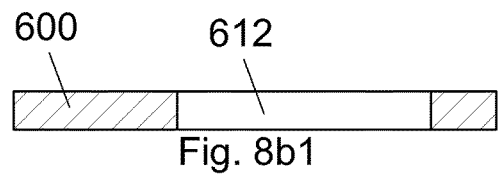
Fig. 8b1
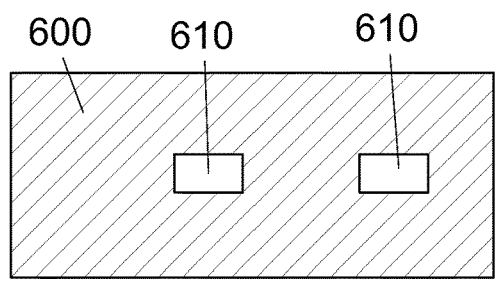
Fig. 8a2
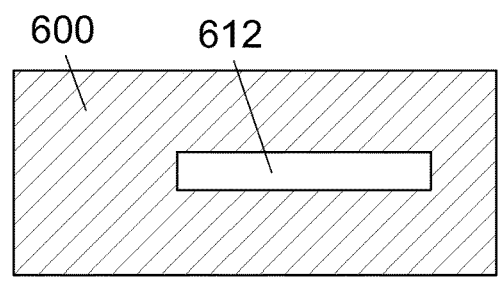
Fig. 8b2

METHOD AND A DEVICE FOR FORMING A DROPLET OR DROPLETS ONTO A FIBRE

TECHNICAL FIELD

The invention relates to methods and devices for forming a droplet or droplets onto a fibre or fibres. The droplet(s) can be solidified. A solid droplet is formed by forming a droplet from a liquid or viscous material and allowing the material of the droplet to solidify. Fibres equipped with solid droplets are needed in tests for adhesion strength between the fibre and the material of the solid droplet. Thus, the invention relates also to measurements of adhesion strength of fibres.

BACKGROUND

Fibres equipped with solid droplets are needed in tests for adhesion strength between the fibre and the material of the solid droplet. Examples of such tests include a fibre pull out test, wherein a fibre is pulled out from matrix material, such as the material of the droplet. For reliable data, a significant number of tests should be made. In known art, the pull out test is made for a sample in which a fibre protrudes from matrix material. One test can be made by pulling the fibre out from the material. In known art, such a sample can be prepared e.g. by applying an end of a fibre to the matrix material, and allowing the matrix material to solidify e.g. in a mould. In this way, a sample is produced, and an end of the fibre protrudes from the matrix material.

This method has the drawback that the pull out test can be made only one time for one sample, since once the fibre has been pulled out from the matrix, it cannot be tested again. Therefore, a significant number of different samples are needed, whereby the preparation of samples is expensive. Moreover, since each fibre can be used to form only one sample, the number of fibres needed for the preparation of the samples is significantly high. Furthermore, each sample may be reasonably large. Therefore, also the consumption of matrix material may be significant.

SUMMARY

In order to overcome the aforementioned problem, a method for forming a droplet onto a fibre is disclosed. Since the droplet is small, the use of matrix material is reduced. In an embodiment, at least two droplets are formed on a single fibre, whereby also the use of fibres is reduced. As will be disclosed, in some embodiments, two, three, four, five, or more than five droplets are formed on the same fibre. In addition, a corresponding device is also disclosed.

In the method, a part of a primary fibre is arranged into liquid or viscous polymer based material. The primary fibre penetrates a gas-material interface or two gas-material interfaces in at least two points. The gas-material interface is an interface between the liquid or viscous polymer based material and surrounding gas, typically air. Thus, in the method, the fibre is arranged such that it extends through the liquid or viscous polymer based material and on both sides of the liquid or viscous polymer based material.

Thereafter, during a first primary period of time, the primary fibre and/or the liquid or viscous polymer based material are moved relative to each other such that a first part of the primary fibre moves out from the liquid or viscous polymer based material, such as a reserve of the liquid or viscous polymer based material, with a first primary velocity. Because of the part of the fibre coming out from the liquid or viscous polymer based material, a first primary layer of the liquid or viscous polymer based material is formed onto the part of the primary fibre. During the first primary period of time, the primary fibre is moved relative to the liquid or viscous polymer based material in a direction. The direction may be longitudinal, i.e. substantially parallel to the length of the fibre, transversal, i.e. substantially perpendicular to the length of the fibre, or the direction may have a longitudinal and a transversal component, i.e. a component that is parallel to the length of the fibre and another component that is perpendicular to the length of the fibre.

Thereafter, during a first secondary period of time, the first primary layer of the liquid or viscous polymer based material is allowed to form a first primary droplet onto the primary fibre. After the formation of the first primary droplet, the primary fibre extends through the first primary droplet and on both sides of the first primary droplet. The first primary layer of the liquid or viscous polymer based material is allowed to form the first primary droplet by [i] holding still the primary fibre relative to the liquid or viscous polymer based material or [ii] moving the primary fibre and/or the liquid or viscous polymer based material relative to each other with a first secondary velocity that is slower than the first primary velocity. After forming the droplet of the liquid or viscous polymer based material, the droplet is solidified or allowed to solidify.

A corresponding device comprises means for performing the method, as detailed below.

The method according to the invention is disclosed in the independent claim 1. Preferable embodiments are disclosed in the dependent claims 2-35. The device according to the invention is disclosed in the independent claim 36. Preferable embodiments are disclosed in the dependent claims 37-55.

BRIEF DESCRIPTION OF THE DRAWINGS

FIGS. 6a-6e show a method for forming a solid droplet onto a fibre by moving the fibre in a longitudinal direction, FIGS. 8a1 and 8a2 show in a side view and a top view, respectively, a substrate with two apertures, FIGS. 8b1 and 8b2 show in a side view and a top view, respectively, a substrate with a slit.

DETAILED DESCRIPTION

Figure 1A:
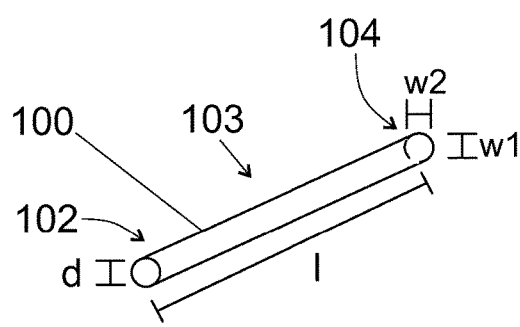
FIG. 1a shows a non-hollow fibre.

The method and device 500 of the embodiments relate to forming a droplet or droplets 151, 152, 153, 351 onto a fibre 100 or fibres 100, 300. The droplet or droplets may be solidified to form a solid droplet or droplets 161, 162, 163, 361 onto a fibre 100 or fibres 100, 300. In the method, droplets may be formed on multiple fibres, such as a primary fibre 100 and a secondary fibre 300. The expression "fibre" refers in particular to the primary fibre 100, and the properties of a fibre 100, 300 are equally applicable to the secondary fibre 300.

Figure 1B:
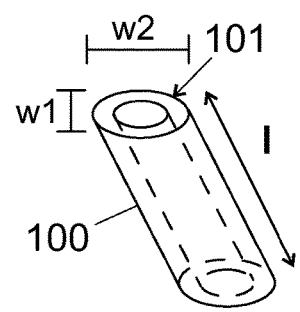
FIG. 1b shows a hollow fibre.

In this description, a fibre 100, 300 refers to an object having two large aspect ratios. The fibre has a length l, a first width w1 and a second width w2, wherein the second width is directed perpendicular to the first width w1. Both widths w1, w2 are perpendicular to the length l. Referring to FIG. 1a, when the fibre has a circular cross section, the diameter of the fibre 100 equals both the widths w1, w2. Referring to FIG. 1b, in case the widths w1 and w2 are not equal, an equivalent diameter d of the fibre 100 can be defined by $d=\sqrt{(4 A/\pi)}$, wherein A is the area limited by a perimeter 101 (i.e. an outer edge) of a cross section of the fibre 100, the cross section being defined on a plane having a surface normal parallel to the length l of the fibre 100. The fibre 100 itself may be hollow or non-hollow. The equivalent diameter is defined by means of the perimeter in order to reflect the outer size of the fibre 100. In an embodiment, the equivalent diameter (or the diameter, if defined) of the fibre 100 is from is from 1 μm to 500 μm; preferably from 3 μm to 200 μm. A fibre 100 comprises a first end 102, a second end 104, and a middle part 103.

The length l of a fibre 100 is significantly higher than the equivalent diameter d. In an embodiment, the ratio of the length l to the equivalent diameter is at least 100, such as at least 1000. In an embodiment, the length l is at least 1 mm. Moreover, in an embodiment, the two widths w1, w2 of the fibre are of the same order of magnitude. Therefore, in an embodiment, the ratio of the two widths w1 and w2, i.e. w1/w2, is between 0.1 and 10. Preferably, the widths w1, w2 are substantially equal, e.g. in the meaning that w1/w2 is between 0.5 and 2.

In an embodiment, the fibre 100, 300 is a natural fibre. The fibre 100, 300 may be e.g. a mineral fibre (e.g. a basalt fibre) or a biological fibre. Biological fibres include fauna fibres (i.e. fibres from fauna origin), e.g. spider silk or human hair, and flora fibres (i.e. fibres from flora origin). Examples of flora fibres include wood fibres (e.g. a bamboo fibre) and other vegetable fibres (e.g. cotton fibre or a flax fibre).

In an embodiment, the fibre 100, 300 has been produced artificially. In an embodiment, the fibre 100, 300 comprises at least one of a metal (e.g. steel, aluminium, copper, or titanium), carbon, glass, ceramic fibres (such as silicon carbide or silicon carbide glass), aramid (for example those by the names such as Kevlar®, Twaron®, or Conex®), a synthetic chemical based material such as a polymer (e.g. liquid-crystal polymers, thermoplastic polymers, and thermoset polymers), and a semi-synthetic material (e.g. regenerated cellulose). More specific examples of polymer fibres usable with the invention include polypropylene, polyamide, and polyethylene terephthalate. In an embodiment, the fibre 100 is made from one of the aforementioned materials.

In an embodiment of the method, the fibre 100, 300 comprises at least one of a metal (e.g. steel), carbon, cellulose, a cellulose-based material, glass, aramid, para-aramid, paraphenylene terephthalamide, cotton, rayon, polyamide (i.e. Nylon), polyester, and polyethylene terephthalate. Preferably, the fibre 100, 300 is made from one the aforementioned materials.

Figure 1C:
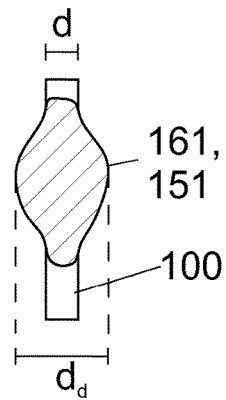
FIG. 1c shows a droplet or a solid droplet on a fibre.

Referring to FIG. 1c, a solid droplet 161 is made onto the fibre 100, i.e. the primary fibre 100, by solidifying a droplet 151 of a liquid or viscous material.

Figure 2A:
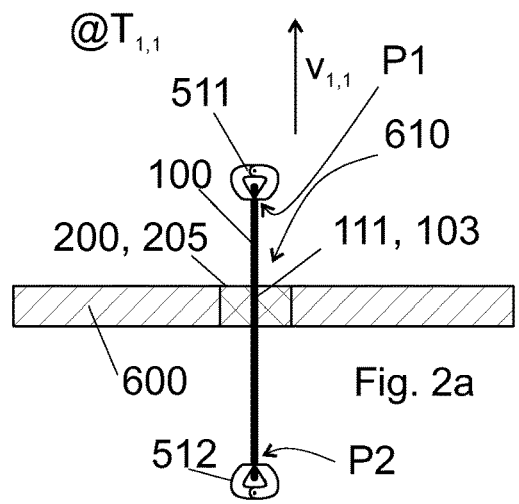
FIGS. 2a-2i show a method for forming three droplets onto a fibre subsequently by moving the fibre in a longitudinal direction of the fibre.
Figure 2B:
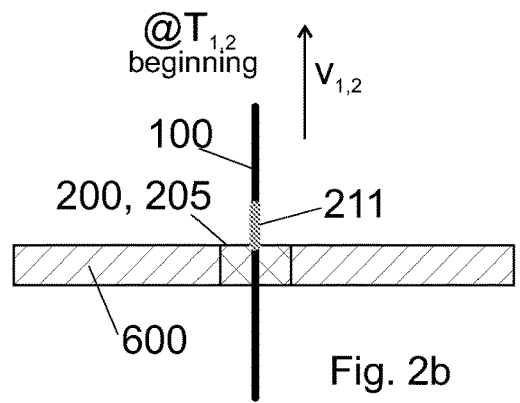

Referring to FIGS. 2a and 2b, in order to form a droplet onto the fibre 100, at least part of a primary fibre 100 is arranged into a reserve 205 of liquid or viscous polymer based material 200. The fibre 100 is held, e.g. from at least one of its ends 102, 104, in order to move the fibre 100 relative to the reserve 205 of the material 200.

It has been found that liquid or viscous polymer based materials 200 tend to form droplets, in order to minimize their surface area (and thus also the total surface energy). This phenomenon is related to surface tension of the material 200. As a result, if a fibre 100 is slowly pulled out from the reserve 205 of liquid or viscous polymer based material 200, the surface tension of the material 200 pulls the material 200 from the surface of the fibre 200 back to the reserve 205, in order to minimize the surface energy. Thus, only a thin layer of the material 200, if any, would be left on to fibre 100.

However, it has been found, that if the velocity $v_{1,1}$ (see FIGS. 2a and 3a) by which the fibre 100 is pulled out from the reserve 205 of liquid or viscous polymer based material 200 exceeds a certain limit, the material 200 does not have enough time to be pulled back to the reserve 205, because of its viscosity. Therefore, in this case, a much thicker layer 211 (see FIGS. 2b and 3b) of the material 200 remains on the fibre 100.

It has been found that, provided that the fibre 100 is pulled out from the reserve 205 of liquid or viscous polymer based material 200 in a longitudinal direction (see FIGS. 2a-2i) with the velocity $v_{1,1}$, which exceeds the limit, by a distance $l_{211}$ that exceeds another limit, the layer 211 of the material 200 on the fibre 100 starts to form a droplet 151, which is separate from the reserve 205. In this way, a single droplet 151 can be formed onto the fibre 100. The velocity may affect the thickness of the layer 211. Moreover, a distance $d_1$ is left in between the droplet 151 and the reservoir 205. As for preferable values of the velocity $v_{1,1}$ and the length $l_{211}$, these issues will be discussed in detail below. However, it is noted, that the limiting values may depend on material 200 used; at least on its viscosity, and probably also in its surface tension.

Moreover, when the fibre 100 is pulled out from the reserve 205 of liquid or viscous polymer based material 200 in a transversal direction (see FIGS. 3a-3c) with the velocity $v_{1,1}$, which exceeds the limit, a layer 211 is formed on the fibres, and the layer 211 forms a droplet 151. The velocity may affect the thickness of the layer 211. Moreover, a distance between neighbouring reservoirs (205, 207, 209) determines a distance between neighbouring droplets (151, 152, 153), if multiple reservoirs are used (see FIGS. 4a to 4c).

FIGS. 2a to 2i; 3a to 3c; 4a to 4c; 6a to 6e; and 7a to 7d show in more detail how a first primary solid droplet 161 can be made onto a primary fibre 100.

In a figure, the sign @ together with a reference sign for a period of time, such as $T_{1,1}$ or $T_{1,2}$, indicates to which time the figure relates. In addition, the words "beginning" and "end" refer to a beginning and an end of the period of time, respectively. Without the word "beginning" or "end", the figure relates substantially to the whole period of the time.

In an embodiment of the method, only a part of a primary fibre 100 is arranged into a reserve 205 of liquid or viscous polymer based material 200 such that that the primary fibre 100 extends through the reserve 205 and on both sides of the reserve 205. Moreover, a point where the primary fibre 100 penetrates the interface between gas (e.g. air) and the reserve 205, an angle of at most 45 degrees forms in between the longitudinal direction of the primary fibre 100 and a normal of the interface at that point. Preferably the angle is at most 30 degrees.

Figure 3A:
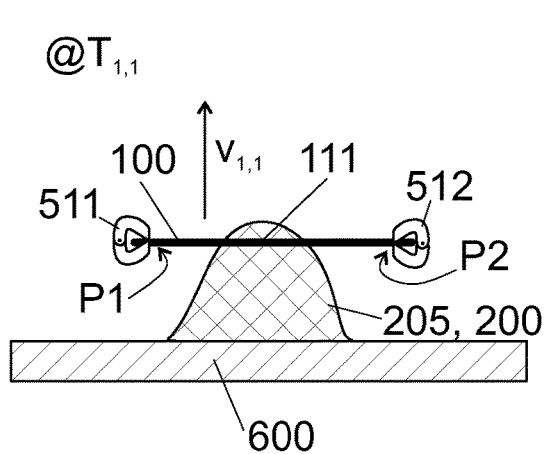
FIGS. 3a-3c show a method for forming a droplet onto a fibre by moving the fibre in a transverse direction of the fibre.

What has been said about a fibre 100 concerns the primary fibre 100. The part of the primary fibre 100 that is arranged in the material 200 may be a central part 103 of the fibre 100, as indicated in FIGS. 2a and 3a. Referring to FIGS. 2a and 3a, in an embodiment, the fibre 100, 300 is held from a first point P1 and a second point P2. The points P1 and P2 are not arranged in the reserve 205 of the material 200. In between the points P1 and P2, the fibre 100, 300 penetrates through the reserve 205. Holding the fibre 100, 300 from two points has the effect that the fibre 100, 300 can be tightened to be substantially straight in between the points P1 and P2. This helps handling of the fibre, in particular, when the reserve or reserves is/are small. In an embodiment, the primary fibre 100 is held from the first point P1 by a first primary fibre holder 511. In an embodiment, the primary fibre 100 is held from the second point P2 by a second primary fibre holder 512.

Referring to FIGS. 2a and 3a, thereafter, during a first primary period of time $T_{1,1}$, the primary fibre 100 and/or the reserve 205 of the liquid or viscous polymer based material 200 are moved relative to each other. In an embodiment, where the primary fibre 100 is held from both ends 102, 104, during the first primary period of time $T_{1,1}$, only a middle part 103 of the primary fibre 100 is arranged in the reserve 205 of the liquid or viscous polymer based material 200, and the primary fibre 100 extends through the reserve 205 of the liquid or viscous polymer based material 200 and on both sides of the reserve 205 of the liquid or viscous polymer based material 200. Correspondingly, during the first primary period of time $T_{1,1}$, the first end 102 of the primary fibre is not arranged into the liquid or viscous polymer based material 200 and the second end 104 (i.e. the other end) is not arranged into the reserve 205 liquid or viscous polymer based material 200. This has the technical effect that the length of the fibre can exceed the length of the reserve 205 of the liquid or viscous polymer based material 200. This allows for using only a small amount of the liquid or viscous polymer based material 200. Moreover, as neither the first primary fibre holder 511 nor the secondary primary fibre holder 512 is arranged in the reserve 205, they need not be cleaned from the liquid or viscous polymer based material 200.

FIGS. 2, 5, 6, and 7 show examples of a method for forming droplets, in which the fibre is moved in a longitudinal direction. FIGS. 9b, 10b, and 11a show corresponding devices. FIGS. 3 and 4 show examples of a method for forming droplets, in which the fibre is moved in a transversal direction. FIGS. 9a, 10a, 10c, and 10d show corresponding devices. Even if not shown, the fibre may be moved in a direction having a component that is parallel to the length of the fibre and another component that is perpendicular to the length of the fibre. Preferably, the fibre is moved substantially longitudinally or substantially transversally. In the former case, the centre of the fibre is moved in a direction that forms an angle of at most 15 degrees or at most 5 degrees with the longitudinal direction of the fibre. In the latter case, the centre of the fibre is moved in a direction that forms an angle of at most 15 degrees or at most 5 degrees with the transverse direction of the fibre. Furthermore, preferably, the fibre is moved without rotating it about a longitudinal axis and without rotating it about a transversal axis, whereby all parts of the fibre are moved in the same direction and by the same velocity.

Figure 8C:
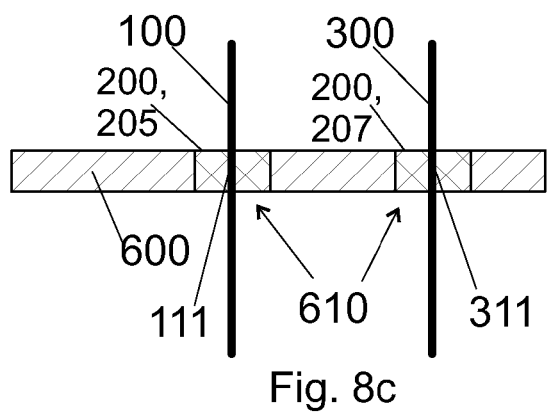
FIG. 8c shows a substrate having two apertures, each one forming a reserve of the same material.

In an embodiment, wherein the primary fibre 100 is moved in the longitudinal direction, preferably the liquid or viscous polymer based material 200 is arranged in an aperture 610 or a slit 612 of a substrate 600 (see FIGS. 2a-2i and 5a-5f). Thus, the material 200 in the aperture 610 or the slit 612 forms the reserve 205. As indicated in these Figs. the fibre 100 penetrates the aperture 610 or the slit 612. However, as indicated in FIGS. 6a to 6e, a fibre 100 can penetrate through the reserve 205 liquid or viscous polymer based material 200 even if a slit or an aperture is not used and the primary fibre 100 is moved in the longitudinal direction. However, using a substrate with an aperture 610 or a slit 612 helps to control the location of the reserve 205. FIG. 8a2 shows in a top view a substrate 600 having two apertures 610. FIG. 8a1 shows in a side view the substrate 600 of FIG. 8a2. A fibre may extend through an aperture 610, as indicated in FIGS. 2a and 8c. FIG. 8b2 shows in a top view a substrate 600 having a slit 612. FIG. 8b1 shows in a side view the substrate 600 of FIG. 8b2. Two or more fibres may extend through a slit 612, as indicated in FIG. 10b.

Figure 8D:
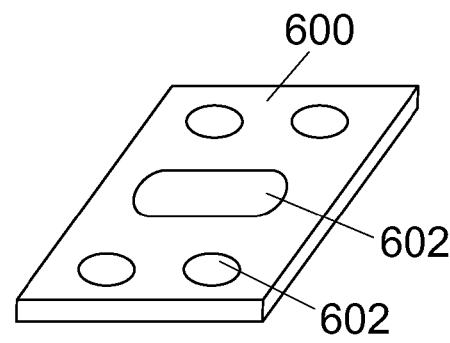
FIG. 8d shows a substrate having blind holes for holding polymer based material for transversal movement of a fibre.

In an embodiment, wherein the primary fibre 100 is moved in the transversal direction, the liquid or viscous polymer based material 200 is arranged on a substrate 600. Referring to FIG. 8d, the substrate may comprise blind holes 602 for receiving the liquid or viscous polymer material(s). Some of the holes 602 may receive material that serves for reserves (205, 207, 405) for material for the primary fibre 100 (see FIGS. 8d and 10a). Some of the holes 602 may receive material that serves for reserves (205, 207, 405) for material for a secondary fibre 300 (see FIGS. 8d, 10a, 10c, and 10d). Some of the holes 602 may receive material that serves for reserves (205, 207, 405) for material for the primary fibre 100 and the secondary fibre 400 (see FIGS. 8d, 10a, 10c, and 10d). Such holes help locating the liquid or viscous polymer material comprised by the reserve in a correct place. Moreover, the material of the substrate may be selected such that the liquid or viscous polymer based material 200 is capable of forming droplets on the substrate 600. Thus, preferably, the wetting angle of the liquid or viscous polymer material on the substrate is at least 45 degrees.

It is possible that electric charge of the material 200 affects the process of forming droplets. Electric charge can be conducted away from the material 200 via the substrate 600 when the substrate is made of electrically conductive material. In an embodiment, the substrate 600 comprises material that has an electrical resistivity of at most 0.1 Ωm at a temperature of 20° C.

Figure 3B:
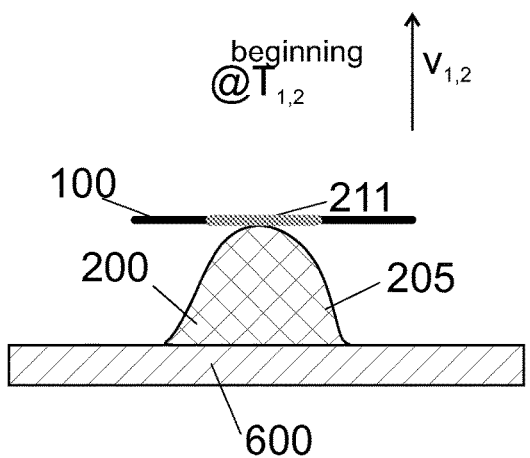

As a result of the aforementioned movement of the fibre 100, and/or the reserve 205, a first part 111 of the primary fibre 100 moves out from the reserve 205 of the liquid or viscous polymer based material 200 with a first primary velocity $v_{1,1}$. The length the fibre 100 moves relative to the reserve 205 during the first primary period of time is referred to as a stroke length. During the movement, some of the liquid or viscous polymer based material 200 remains on the first part 111, whereby a first primary layer 211 of the liquid or viscous polymer based material 200 is formed onto the first part 111 of the primary fibre 100, as indicated in FIGS. 2b and 3b. In an embodiment, the fibre is moved relative to floor or ground. In an embodiment, the reserve 205 is stationary relative to floor or ground. During the first primary period of time $T_{1,1}$, the first primary velocity $v_{1,1}$ needs not to be constant. As indicated above, in order to obtain a reasonably thick primary layer 211, the first primary velocity $v_{1,1}$ exceeds a first limit. The first primary velocity $v_{1,1}$ may be e.g. at least 0.5 mm/s or at least 1 mm/s. The first primary velocity $v_{1,1}$ may be e.g. from 0.5 mm/s to 50 mm/s; such as from 1 mm/s to 25 mm/s.

It has been noticed that the primary layer 211 of liquid or viscous polymer based material 200 on the primary fibre 100 spontaneously forms at least a droplet onto the primary fibre 100. This is most likely because of the surface tension of the material 200 and the tendency of minimizing surface energy. In case of transversal movement of the fibre (FIGS. 3 and 4) this happens independent of the length $l_{211}$ of the primary layer 211, when the layer 211 has been separated from the reservoir (see FIGS. 3c and 4c). In case of longitudinal movement (FIGS. 2, 5, and 6) this happens at least when the length $l_{211}$ of the primary layer 211 exceeds a second limit, whereby the reserve 205 does not pull the material of the layer 210 back to the reservoir 205, but a separate droplet can be formed. In case of longitudinal movement, the length $l_{211}$ of the primary layer 211 is substantially equivalent to the aforementioned stroke length. The value of the second limit may depend on the diameter of the fibre 100 so that a smaller length $l_{211}$ suffices for a thinner fibre 100 in order to form a droplet.

Irrespective of the direction of the movement of the fibre 100, it has been noticed, that if the length $l_{211}$ of the primary layer 211 exceeds a third limit, more than one droplets are formed. In case of longitudinal movement, the third limit is greater than the second limit. Thus, the length $l_{211}$ of the primary layer 211 can be controlled in such a way that only one droplet is formed at a time and for a reservoir. In case of longitudinal movement, this involves controlling the stroke length, i.e. the duration of the first primary period of time $T_{1,1}$ and/or the first primary velocity $v_{1,1}$. In case of transversal movement, this involves controlling the size of the reservoir 205. Moreover, when only one droplet becomes formed, the length $l_{211}$ determines, to some extent, the size of the droplet. In addition, the thickness of the layer 211 determines, to some extent, the size of the droplet. The thickness may be affected by the first primary velocity $v_{1,1}$.

An embodiment comprises selecting the first primary velocity $v_{1,1}$ and/or the duration of the a first primary period of time $T_{1,1}$ and/or the size of the reserve in such a way that during a first secondary period of time $T_{1,2}$ (as will be detailed below), only one first primary droplet 151 forms onto the primary fibre 100 from the material 200 of a reserve 205. An embodiment, wherein the fibre is moved in the longitudinal direction relative to the reserve 205, comprises selecting the first primary velocity $v_{1,1}$ and/or the duration of the a first primary period of time $T_{1,1}$ in such a way that during a first secondary period of time $T_{1,2}$ (as will be detailed below), only one first primary droplet 151 forms onto the primary fibre 100. In an embodiment, the duration of the first primary period of time $T_{1,1}$ is at least 100 ms. The length $l_{211}$ of the primary layer 211 may be e.g. at least 10 μm, such as at least 30 μm, such as from 30 μm to 500 μm, such as from 100 μm to 500 μm; such as 200 μm (one significant digit). The length $l_{211}$ of the primary layer 211 may equal the length of the first part 111, i.e. the part that is drawn out of the reserve 205 of the material 200. However, when the fibre 100 is pulled in the longitudinal direction the length $l_{211}$ of the primary layer 211 may be less than the length of such a part of the fibre that is arranged in the reserve 205. This is clearly depicted in FIGS. 7a to 7d. However also in other embodiments, a thick substrate 600 could be used, whereby the depth of the reserve 205 could exceed the length $l_{211}$. An embodiment, wherein the fibre is moved in the transversal direction relative to the reserve 205, comprises selecting the size of the reservoir 205 such that the length $l_{211}$ of the primary layer 211 is at least 10 μm, such as at least 30 μm, such as from 30 μm to 500 μm, such as from 100 μm to 500 μm; such as 200 μm (one significant digit).

Figure 2C:
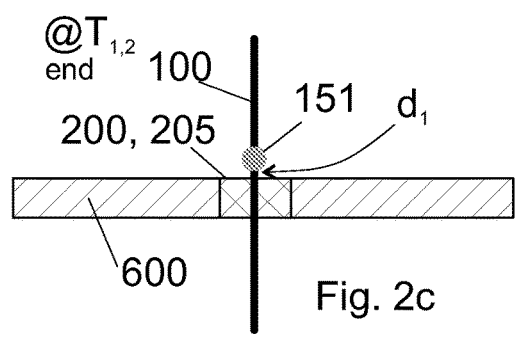
Figure 2D:
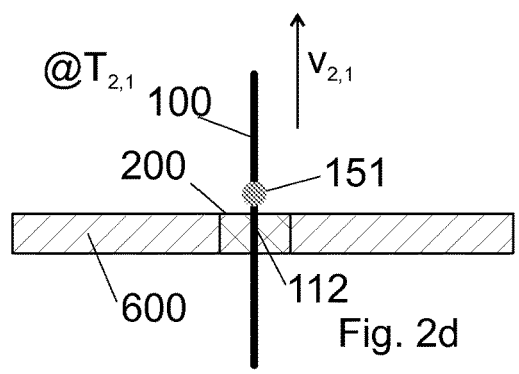
Figure 3C:
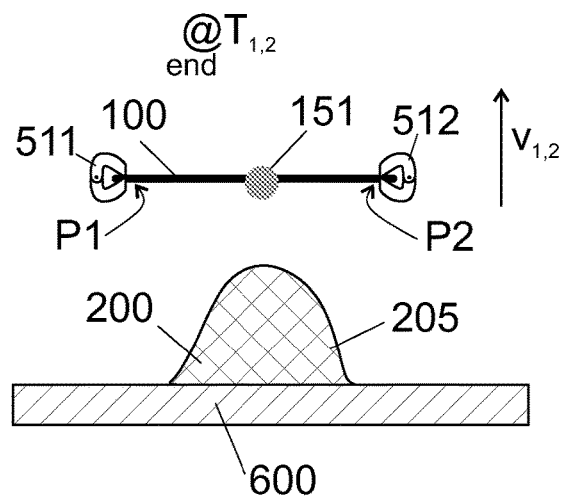

Referring to FIGS. 2c and 3c in an embodiment of the method, during a first secondary period of time $T_{1,2}$, the first primary layer 211 of the liquid or viscous polymer based material 200 is allowed to form at least a first primary droplet 151 onto the primary fibre 100. In an embodiment, wherein the primary fibre 100 is pulled out from the reserve 205 in the longitudinal direction, a primary droplet forms, when the primary fibre 100 is pulled out from the reserve 205 slowly enough. In an embodiment, wherein the primary fibre 100 has been pulled out from the reserve 205 in the transversal direction, a primary droplet forms because no part of the fibre is arranged in the reserve 205.

When the first primary droplet 151 forms (and has been formed), the primary fibre 100 extends through the first primary droplet 151 and on both sides of the first primary droplet 151. Moreover, when the droplet 151 has formed, the droplet 151 becomes separated from the reserve 205, e.g. by a distance $d_1$. The distance $d_1$ may depend on the size of the droplet 151, which may depend on the length $l_{211}$. The distance d1 may be e.g. at least 5 μm. In case the fibre is pulled in the longitudinal direction, the distance $d_1$ can be increased e.g. by slowly moving the fibre 100 while the droplet 151 forms, as will be discussed below. In the embodiments of FIGS. 2, 5, and 6, when the first primary droplet 151 forms, at least a part the primary fibre 100 is arranged in the reservoir 205. In the embodiments of FIGS. 3 and 4, when the first primary droplet 151 forms, the whole primary fibre 100 has been pulled out from all reservoirs.

The first primary layer 211 is allowed to form at least a first primary droplet 151 [i] by holding still the primary fibre 100 relative to the reserve 205 of the liquid or viscous polymer based material 200 or [ii] by moving the primary fibre 100 and/or the reserve 205 of the liquid or viscous polymer based material 200 relative to each other with a first secondary velocity $v_{1,2}$ that is less than the first primary velocity $v_{1,1}$. In an embodiment, the first secondary period of time $T_{1,2}$ starts immediately after the first primary period of time $T_{1,1}$. In an embodiment, the duration of the first secondary period of time $T_{1,2}$ is at least 100 ms. This has been found sufficiently long for droplet formation in many cases. In case the first secondary velocity $v_{1,2}$ is greater than zero, preferably the first secondary velocity $v_{1,2}$ is oriented in the same direction as the first primary velocity $v_{1,1}$. The first secondary velocity $v_{1,2}$ needs not to be constant. In case at least one of the velocities $v_{1,2}$ and $v_{1,2}$ is not constant, an average of the first secondary velocity $v_{1,2}$ is less than an average of the first primary velocity $v_{1,1}$. Herein the average of the first primary velocity $v_{1,1}$ refers to time average over the first primary period of time $T_{1,1}$. Herein the average of the first secondary velocity $v_{1,2}$ refers to time average over the first secondary period of time $T_{1,2}$. In an embodiment the first secondary velocity $v_{1,2}$ is at most 10 mm/s or at most 5 mm/s. In an embodiment, the first secondary velocity $v_{1,2}$ is from 0.01 mm/s to 10 mm/s, such as from 0.1 mm/s to 1 mm/s.

As indicated above, the length $l_{211}$ of the layer 211 affects the size of the first primary droplet 151 that forms. Referring to FIG. 1c, in an embodiment, at the end of the first secondary period of time $T_{1,2}$, a diameter $d_d$ of the first primary droplet 151 is from 2 μm to 500 μm more than the diameter d of the primary fibre 100. In an embodiment, wherein the cross-section of the fibre 100 is not circular, as the case may be, at the end of the first secondary period of time $T_{1,2}$, an equivalent diameter $d_d$ of the first primary droplet 151 is from 2 μm to 500 μm more than the equivalent diameter d of the primary fibre 100. The diameter and/or the equivalent diameter refers to the diameter and/or the equivalent diameter as measured from the largest cross section of the droplet; the cross section being defined on a plane having a normal parallel to the length l of the fibre. In an embodiment, the diameter or equivalent diameter $d_d$ of the first primary droplet 151 is from 10 μm to 200 μm, such as from 20 μm to 150 μm more than the diameter or equivalent diameter d of the primary fibre 100. The diameter or the equivalent diameter $d_d$ of the first primary droplet 151 may be e.g. from 5 μm to 500 μm, such as from 20 μm to 150 μm. Typically a cross section of the droplet is circular on a plane having a normal in the longitudinal direction of the fibre even if the cross section of the fibre on the same plane is non-circular.

What has been said about the size of the droplet 151 made of the liquid or viscous polymer based material 200 applies as well to the solidified droplet 161 having been solidified from the droplet 151. In some cases, the droplet may slightly shrink due to solidification, e.g. if the solidification is a result of evaporating solvent.

Figure 7A:
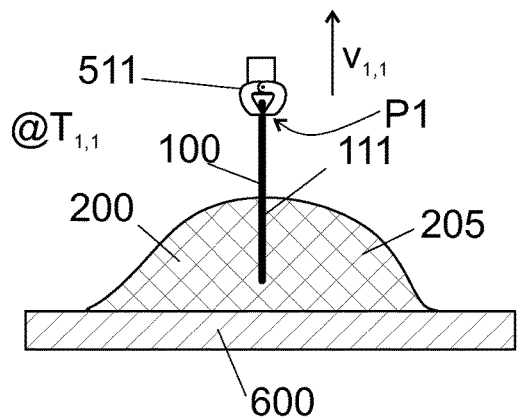
FIGS. 7a-7d show, as an example, a different method for forming a solid droplet onto a fibre.
Figure 7B:
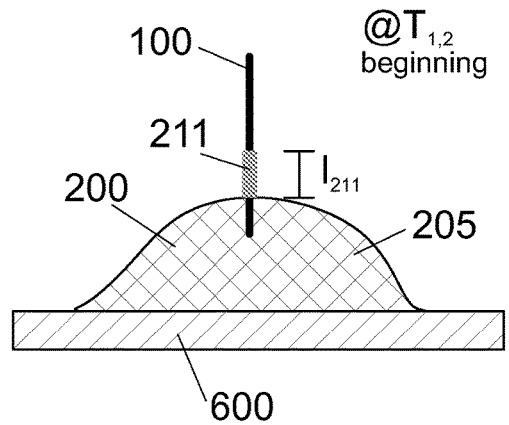
Figure 7C:
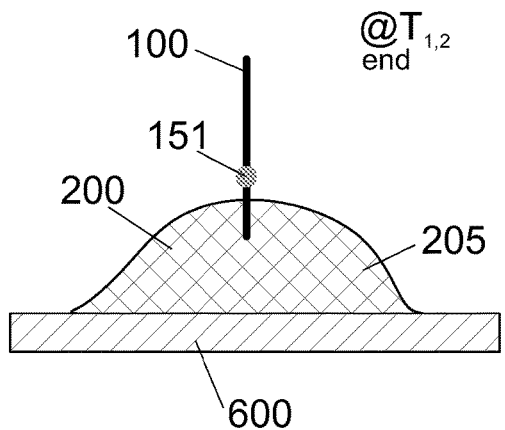
Figure 7D:
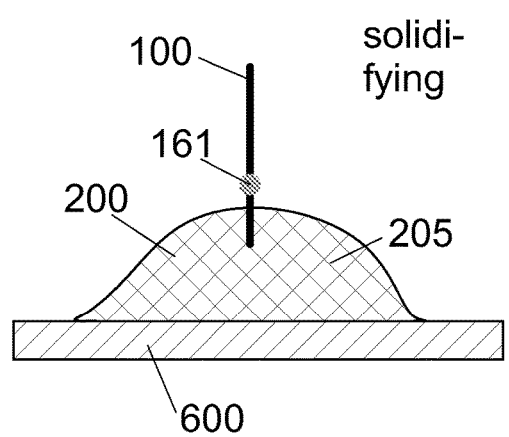

Referring to FIGS. 7c and 7d, after forming the first primary droplet 151, the first primary droplet 151 is solidified or allowed to solidify to form the first primary solid droplet 161. The first primary droplet 151 may be solidified actively by using external energy, such ultraviolet radiation and/or heat, or by thermal conduction, e.g. by cooling the droplet 151. In addition or alternatively, the material 200 of the droplet may be such that it spontaneously solidifies (or would solidify if not actively solidified) after a period of time. The type of solidification depends on the type of the liquid or viscous polymer based material 200 used in the method. It is noted, that the solidification of the droplet 151 does not necessarily take place soon after formation of the droplet. Several droplets can be solidified simultaneously after their formation. A droplet or droplets are solidified also in the embodiments of FIGS. 2 to 6, even if not explicitly depicted therein.

In a preferable embodiment, at least a second droplet is also formed onto the primary fibre 100.

Figure 4A:
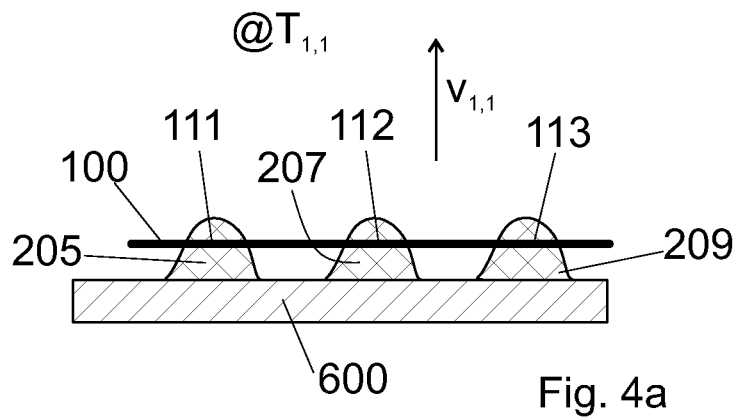
FIGS. 4a-4c show a method for forming three droplets onto a fibre simultaneously by moving the fibre in a transverse direction of the fibre.
Figure 4B:
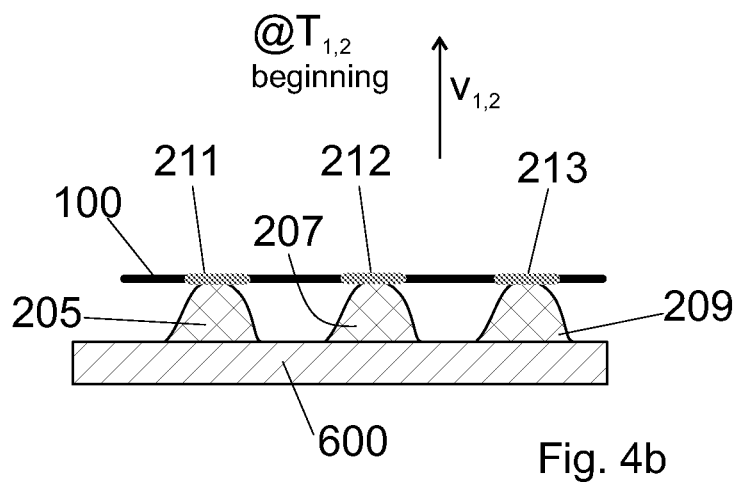
Figure 4C:
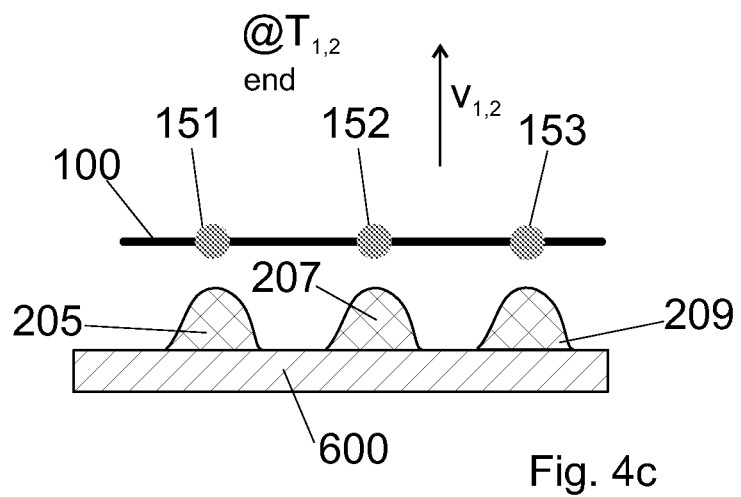

Referring to FIGS. 4a to 4c, when the primary fibre is moved in the transversal direction, multiple droplets can be formed by using multiple reservoirs 205, 207, 209 of the viscous or liquid polymer material 200. Preferably, the size of each reservoir is selected, in the longitudinal direction of the primary fibre 100, such that only one droplet 151, 152, 153 is formed from the layer 211, 212, 213, respectively, of the liquid or viscous material on the primary fibre 100. Moreover, each layer 211, 212, 213 has received its material 200 from different reservoirs 205, 207, 209. Correspondingly, the first primary layer 211 has received its material from a first primary reservoir 205, the second primary layer 212 has received its material from a second primary reservoir 207, and the third primary layer 213 has received its material from a third primary reservoir 209. In this embodiment, the droplets 151, 152, 153 are formed substantially simultaneously. In this way, only one primary droplet forms onto the primary fibre 100 from the material 200 of each one of the reserves.

Figure 2E:
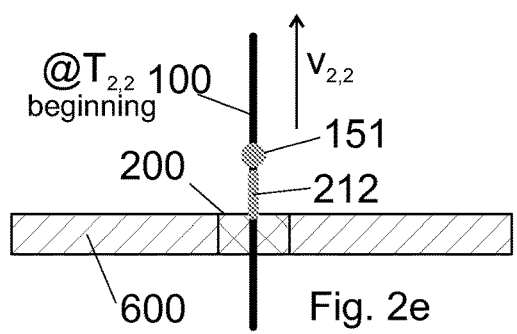

In case the fibre is moved in the longitudinal direction, multiple droplets can be formed by pulling the fibre out from the reservoir in sequence of fast velocities (i.e. primary velocities) separated by slow velocities (i.e. secondary velocities). Referring to FIGS. 2d to 2h, when the primary fibre is moved in the longitudinal direction, another droplet can be formed by moving the primary fibre 100 again with a higher velocity (higher than the secondary velocity $v_{1,2}$), such as the primary velocity $v_{1,1}$. In this embodiment, after the first secondary period of time $T_{1,2}$ at least a second primary droplet 152 is formed onto the primary fibre 100 using the principles discussed above. More specifically and with reference to FIG. 2d, an embodiment of the method comprises during a second primary period of time $T_{2,1}$ after the first secondary period of time $T_{1,2}$, moving the primary fibre 100 and/or the reserve 205 of the liquid or viscous polymer based material 200 relative to each other such that a second part 112 of the primary fibre 100 moves out from the reserve 205 of the liquid or viscous polymer based material 200 with a second primary velocity $v_{2,1}$. In this embodiment, the primary fibre 100 is moved relative to the reservoir 205 in the longitudinal direction. Moreover, during the second primary period of time $T_{2,1}$, only a part of the primary fibre 100 is arranged in the reserve 205 such that the fibre 100 extends through the reserve 205 and on both sides of the reserve 205. What has been said and will be said about the first primary velocity $v_{1,1}$ applies as well to the second primary velocity $v_{2,1}$. These velocities need not be equal. However, in may be preferable to form droplets on a single fibre using same parameters for each droplet on the fibre. Thus, in an embodiment, the first primary velocity $v_{1,1}$ equals the second primary velocity $v_{2,1}$ In this way, a second primary layer 212 of the liquid or viscous polymer based material 200 is formed onto the second part 112 of the primary fibre 100, as indicated in FIG. 2e. The second primary period of time $T_{2,1}$ may start immediately after the first secondary period of time $T_{1,2}$. Preferably, the second primary velocity $v_{2,1}$ is oriented in the same direction as the first primary velocity $v_{1,1}$.

Figure 2F:
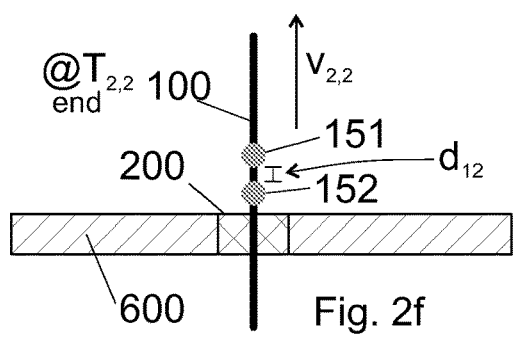

Thereafter, as indicated in FIG. 2f, during a second secondary period of time $T_{2,2}$, the second layer 212 of the liquid or viscous polymer based material 200 is allowed to form a second primary droplet 152 onto the primary fibre 100 such that the primary fibre 100 extends through the second primary droplet 152 and on both sides of the second primary droplet 152. The second secondary period of time $T_{2,2}$ may start immediately after the second primary period of time $T_{2,1}$.

The second primary droplet 152 is formed [i] by holding still the primary fibre 100 relative to the reserve 205 of the liquid or viscous polymer based material 200 or [ii] by moving the primary fibre 100 and/or the reserve 205 of the liquid or viscous polymer based material 200 relative to each other with a second secondary velocity $v_{2,2}$. The second secondary velocity $v_{2,2}$ is, at least on the average, less than the second primary velocity $v_{2,1}$. $v_{2,2}$ may be oriented in the same direction as $v_{2,1}$. The second droplet 152 is formed onto the primary fibre 100 and in between the first droplet 151 and the reservoir 205. In an embodiment, a part of the primary fibre 100 is arranged in the reserve 205 of the liquid or viscous polymer based material 200 while the second primary droplet 152 forms.

In this embodiment, a distance $d_{12}$ between the first primary droplet 151 and the second primary droplet 152 (see FIG. 2f) is affected by the lengths of the first primary layer 211 and the second primary layer 212. In addition, the distance $d_{12}$ is affected by the duration of the first secondary period of time $T_{1,2}$ and the first secondary velocity $v_{1,2}$. In order to have a sufficiently large separation $d_{12}$ in between two neighbouring droplets, preferably, the first secondary velocity $v_{1,2}$ is greater than zero and directed to the same direction as both the first primary velocity $v_{1,1}$ and the second primary velocity $v_{2,1}$. Preferably, a distance $d_{12}$ between the first primary droplet 151 and the second primary droplet 152 is at least 10 µm. The distance $d_{12}$ may be e.g. at least 10 µm, such as from 10 µm to 10 mm, or from 50 µm to 10 mm. This is particularly useful for fibres made for a pull out test. In an embodiment, at least one of the duration of the first secondary period of time $T_{1,2}$ and the first secondary velocity $v_{1,2}$ is selected such that the distance $d_{12}$ is in between these limits.

In the embodiment of FIGS. 4a to 4c, the separation $d_{12}$ in between two neighbouring droplets 151, 152 can be controlled by the locations of the corresponding reserves 205, 207. Also in this embodiment, preferably, a distance $d_{12}$ between the first primary droplet 151 and the second primary droplet 152 is at least 10 µm, such as from 10 µm to 10 mm, or from 50 µm to 10 mm.

After forming the second primary droplet 152, the second primary droplet 152 may be solidified (actively or spontaneously). The second primary droplet 152 may be e.g. actively solidified at the same time the first primary droplet 151 is solidified.

Figure 2G:
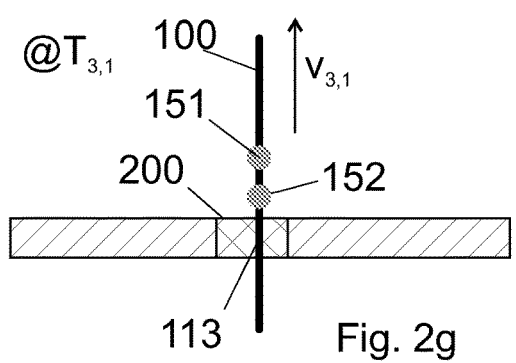
Figure 2H:
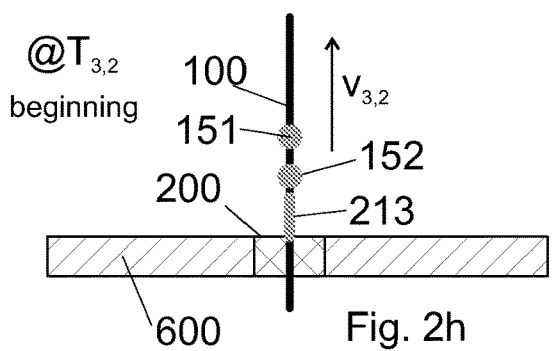
Figure 2I:
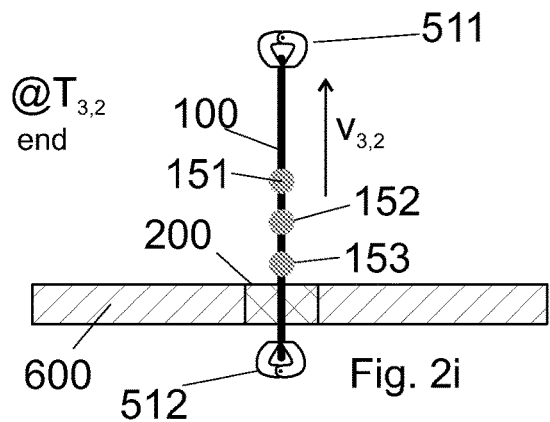

Further droplets, such as a third droplet 153, may also be formed. Referring to FIGS. 2g and 2h, wherein the primary fibre 100 is moved in the longitudinal direction relative to the reserve 205, after forming the second primary droplet 152, during a third primary period of time $T_{3,1}$, the primary fibre 100 and/or the reserve 205 of the liquid or viscous polymer based material 200 may be moved relative to each other in the longitudinal direction of the primary fibre 100 such that a third part 113 of the primary fibre 100 moves out from the reserve 205 of the liquid or viscous polymer based material 200 with a third primary velocity $v_{3,1}$. In this way, a third primary layer 213 of the liquid or viscous polymer based material 200 is formed onto the third part 113 of the primary fibre 100. Thereafter, as indicated in FIGS. 2h and 2i, during a third secondary period of time $T_{3,2}$, the third layer 213 of the liquid or viscous polymer based material 200 is allowed to form a third primary droplet 153 onto the primary fibre 100. The droplet 153 forms [i] by holding still the primary fibre 100 relative to the reserve 205 of the liquid or viscous polymer based material 200 or [ii] by moving the primary fibre 100 and/or the reserve 205 of the liquid or viscous polymer based material 200 relative to each other with a third secondary velocity $v_{3,2}$ that is, at least on the average, less than the third primary velocity $v_{3,1}$. Thereafter, the third primary droplet 153 may be solidified (actively or spontaneously).

Further droplets, such as a fourth primary droplet an optionally a fifth primary droplet may be formed onto the primary fibre in a similar manner. Typically multiple droplets, such as at least ten droplets are formed for a pull out test. In a transversal movement, a suitable number of suitable small reserves can be used. In a longitudinal movement, a suitable number of fast movements, separated from each other by slow movements, can be used.

In case of transversal movement, third, fourth, etc. droplets can be formed by using a corresponding number of reserves 205, 207, 209 (see. FIGS. 4a to 4c for forming three droplets).

As for the liquid or viscous polymer based material 200, many solidifiable polymer based materials can be applied. Examples include uncured thermoset polymers, molten thermoplastic polymers, and polymers dissolved in a solvent. Uncured thermoset polymers solidify, when the polymer is cured, i.e. cross linked. Curing may be e.g. spontaneous, heat activated or UV (ultraviolet) activated. Molten thermoplastic polymers are solidified upon cooling. Polymers dissolved in a solvent are solidified by evaporating the solvent.

In an embodiment, the liquid or viscous polymer based material 200 comprises resin. The resin may be natural resin or synthetic resin. Resins (synthetic or natural) are viscous or highly viscous liquids that are capable of hardening permanently. Examples of usable resins include epoxy resin, polyester resin, phenol formaldehyde resin, acetal resin, and melamine resin.

Preferably, the viscosity of the liquid or viscous polymer based material 200 during the first primary period of time $T_{1,1}$ is in the range from 250 mPas to 50000 mPas, preferably from 500 mPas to 10000 mPas. As for the measurement of the viscosity, the technique described in the standard EN ISO 2555:1999 is used. These values may refer to the viscosity of the material in the reserve 205 during the first primary period of time $T_{1,1}$. These values refer to the viscosity of the material at the temperature during the first primary period of time $T_{1,1}$. For thermoplastic materials the temperature may be high; the temperature may exceed even the recommended temperatures of the standard EN ISO 2555:1999. For thermoset materials (before hardening) the temperature may be e.g. 23° C. Moreover, the viscosity of the thermoset material before hardening may be measured according to EN ISO 2555:1999 at the temperature 23° C., even if the temperature during the first primary period of time $T_{1,1}$ is different. In an embodiment, during the first primary period of time $T_{1,1}$, at least some of the liquid or viscous polymer based material 200 is in the reserve 205 at a temperature from 4° C. to 400° C. and the viscosity of the liquid or viscous polymer based material 200 is in the range from 250 mPas to 50000 mPas or from 500 mPas to 10000 mPas at that temperature. Clearly, some of the material 200 may be arranged at another temperature. In particular, a heated substrate 600 may keep thermoplastic polymer in liquid form, and after forming the droplets 151, 152, 153, . . . the droplets start to cool and solidify.

In an embodiment, during the first primary period of time $T_{1,1}$, the density p of the liquid or viscous polymer based material 200 is in the range from 0.7 g/cm³ to 3 g/cm³, such as from 1 g/cm³ to 2 g/cm³.

It has been noticed, that the aforementioned primary velocity $v_{1,1}$ or primary velocities $v_{1,1}$; $v_{2,1}$; $v_{3,1}$ in connection with the aforementioned properties of the liquid or viscous polymer based material 200 help to form a droplet 151 or droplets 151, 152, 153 of suitable size and in such a way that only one droplet is formed from each layer 211, 212, 213; one droplet from one layer.

Figure 9A:
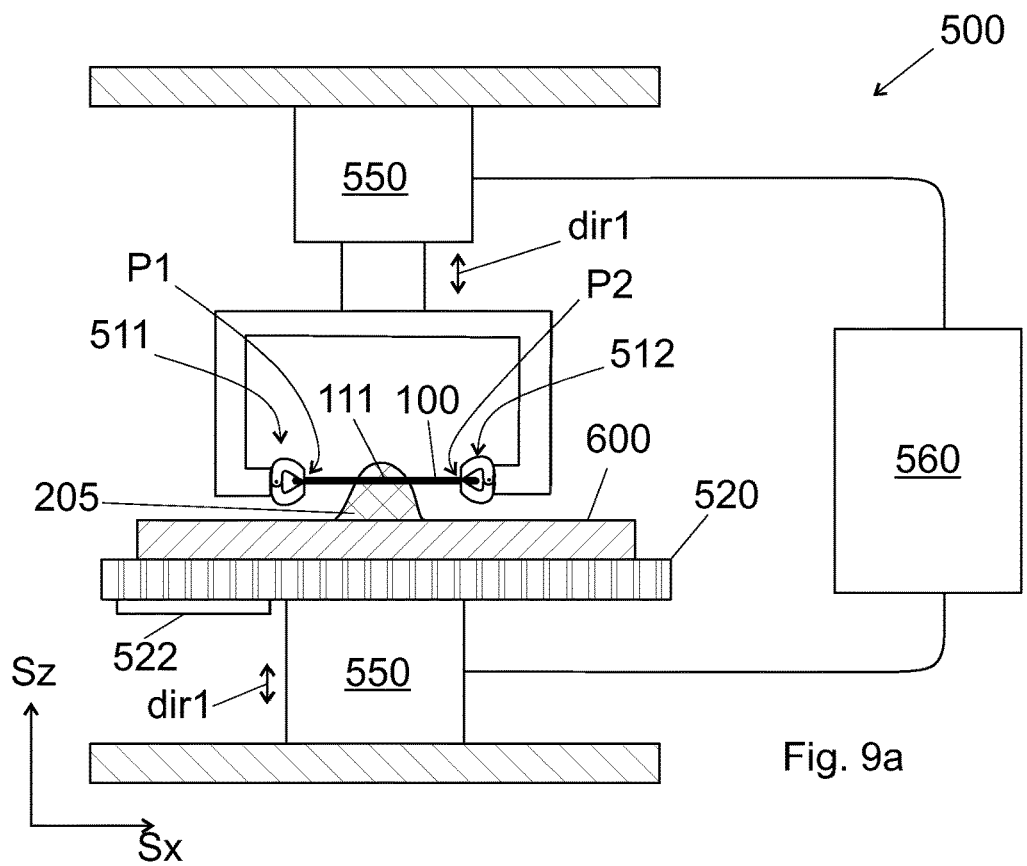
FIGS. 9a and 9b show embodiments of a device for forming a droplet or droplets onto a fibre.
Figure 9B:
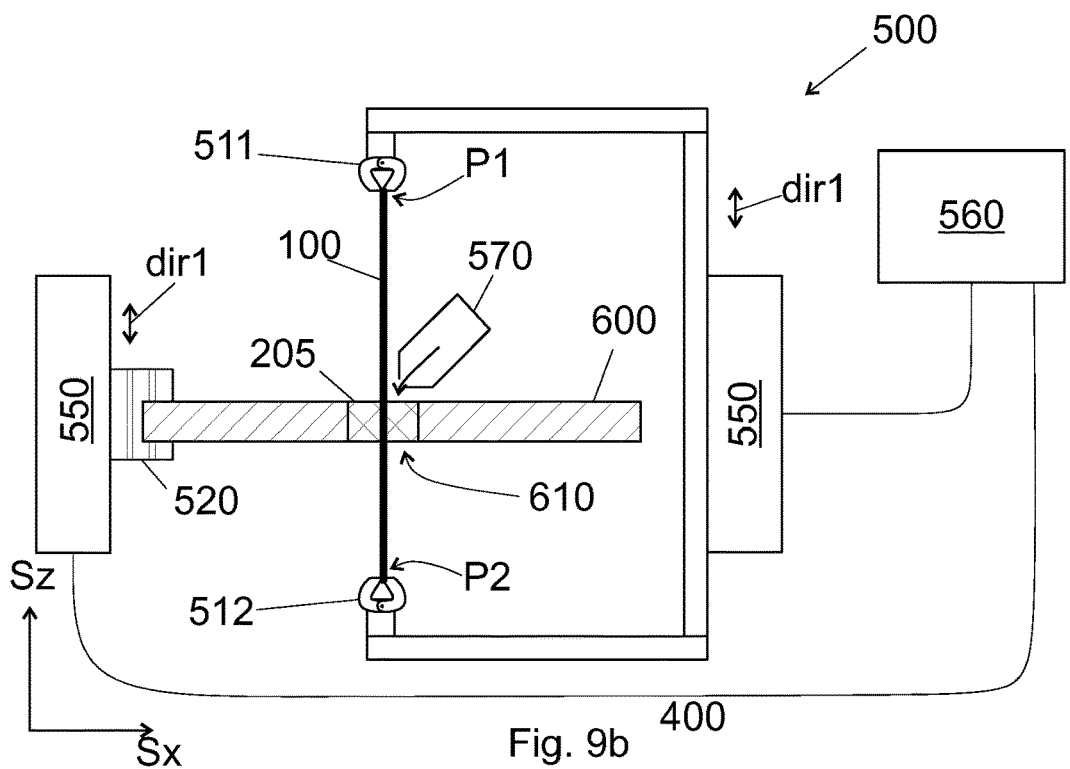

As indicated above, an embodiment comprises heating at least one of [i] the liquid or viscous polymer based material 200, [ii] the substrate 600, and [iii] a substrate holder 520 (see FIGS. 9a and 9b). This may be done in order to keep the liquid or viscous polymer based material 200 in the liquid or viscous state.

Figure 5A:
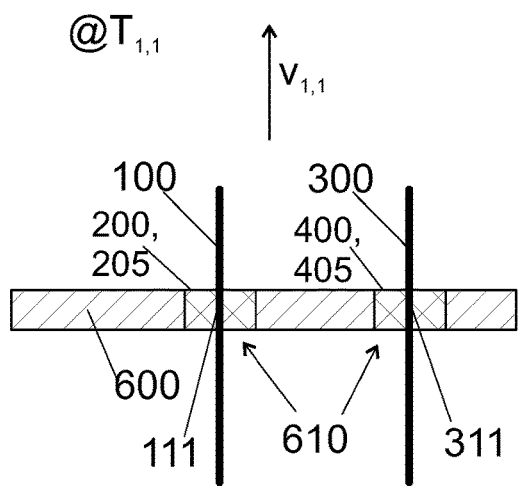
FIGS. 5a-5f show a method for forming subsequently two droplets on each one of two fibres by moving the fibres in a longitudinal direction.
Figure 5B:
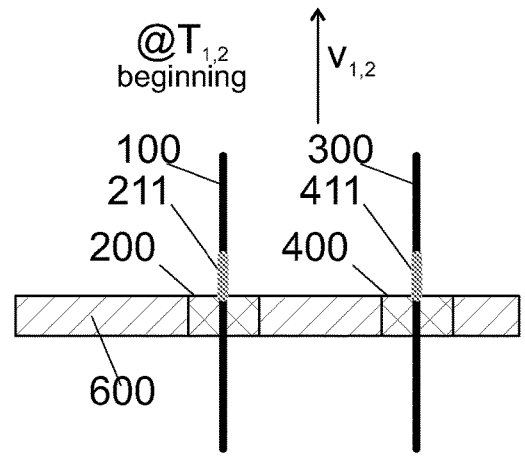
Figure 5C:
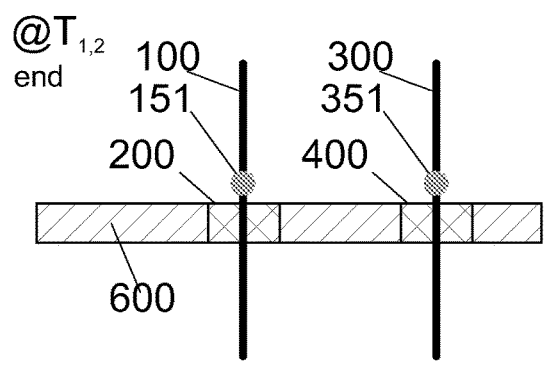
Figure 5D:
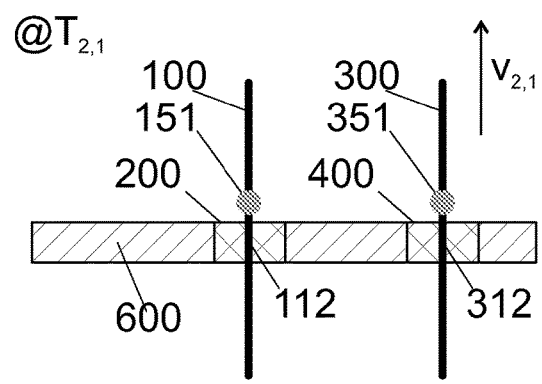
Figure 5E:
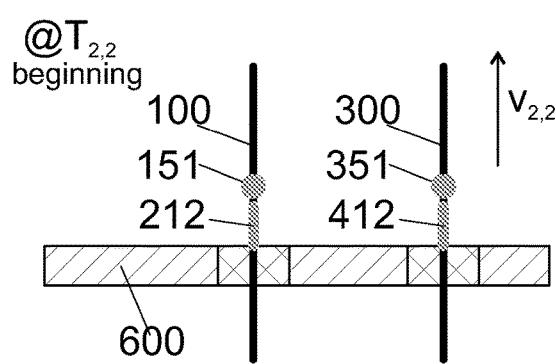
Figure 5F:
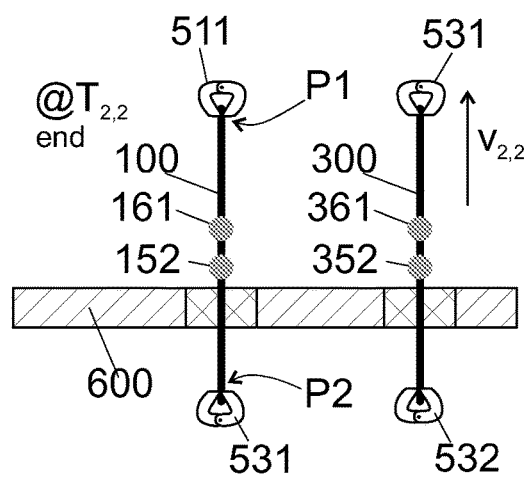

Referring to FIGS. 5a to 5f and 10a to 10d, the method can be applied simultaneously to also to a secondary fibre 300. Thereby first, second, third, etc. secondary droplets (351, 352) can be formed on the secondary fibre 300. The droplets on the secondary fibre 351, 352 may be made from the liquid or viscous polymer based material 200 or other liquid or viscous polymer based material 400. A corresponding embodiment comprises arranging only a part of a secondary fibre 300 into [i] a reserve 405 of other liquid or viscous polymer based material 400 (see FIG. 5a) or [ii] the reserve 205 (see FIG. 10a or 10b) or another reserve 207 (see FIG. 8c) of the liquid or viscous polymer based material 200. Thereby, and as indicated in FIGS. 5a and 10b, either the liquid or viscous polymer based material 200 or the other liquid or viscous polymer based material 400 or surrounds the secondary fibre 300.

Figure 10A:
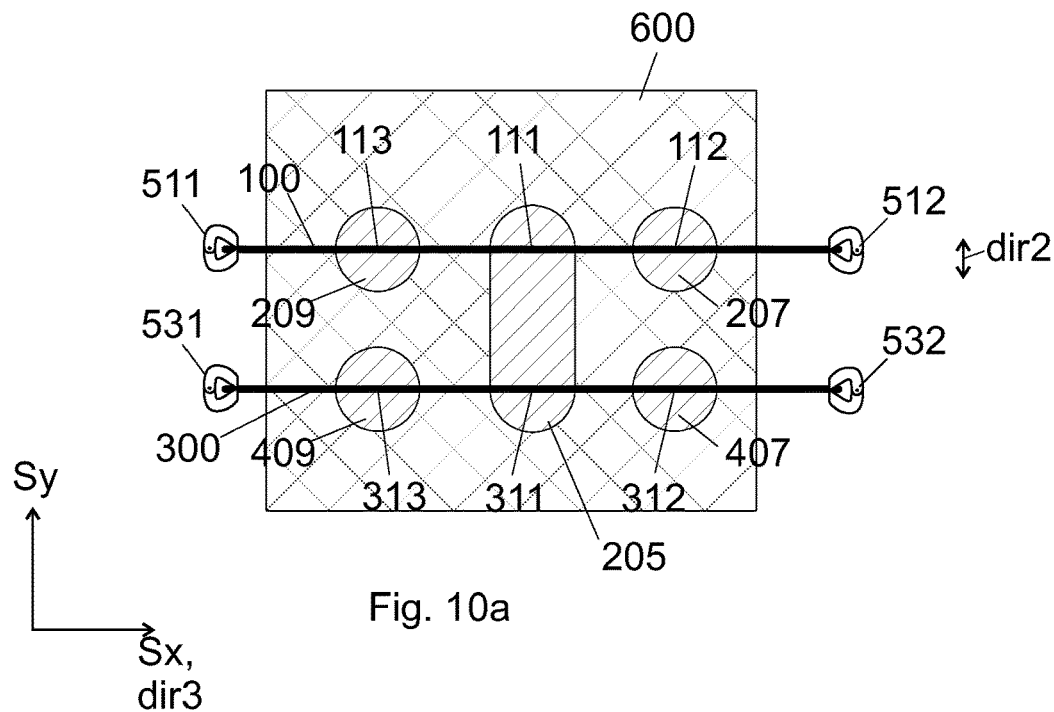
FIGS. 10a to 10d show embodiments of a device for forming a droplet or droplets onto each one of two fibres.
Figure 10B:
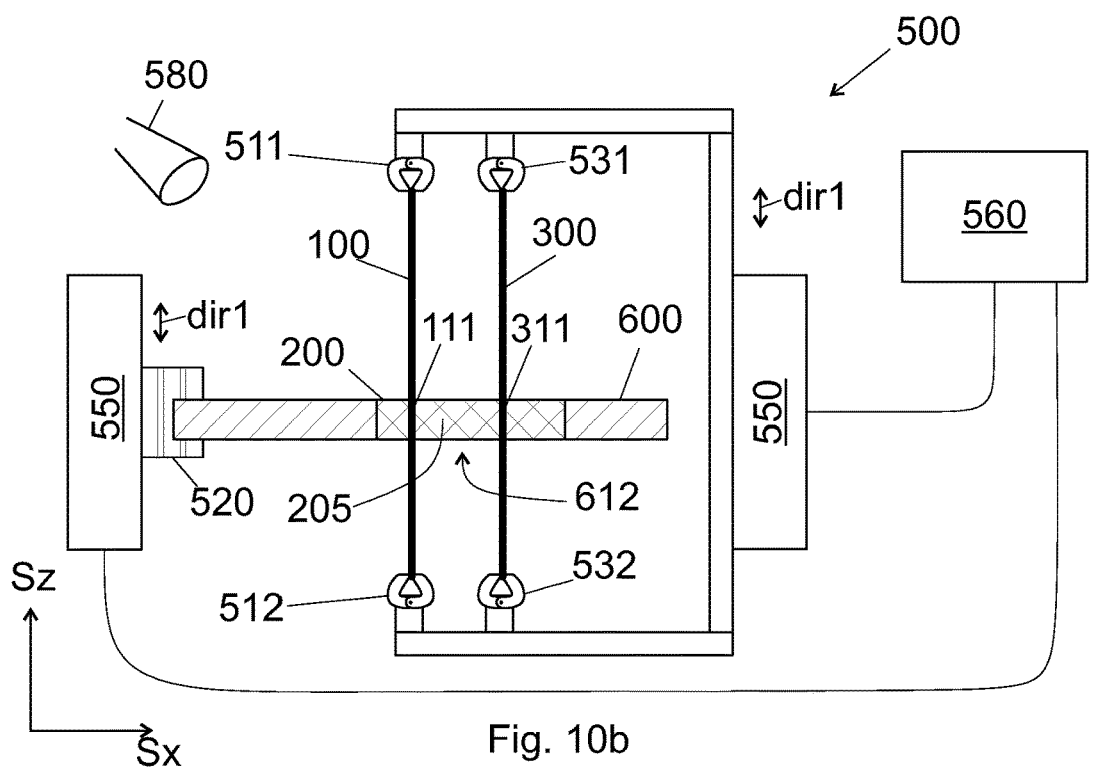
Figure 10C:
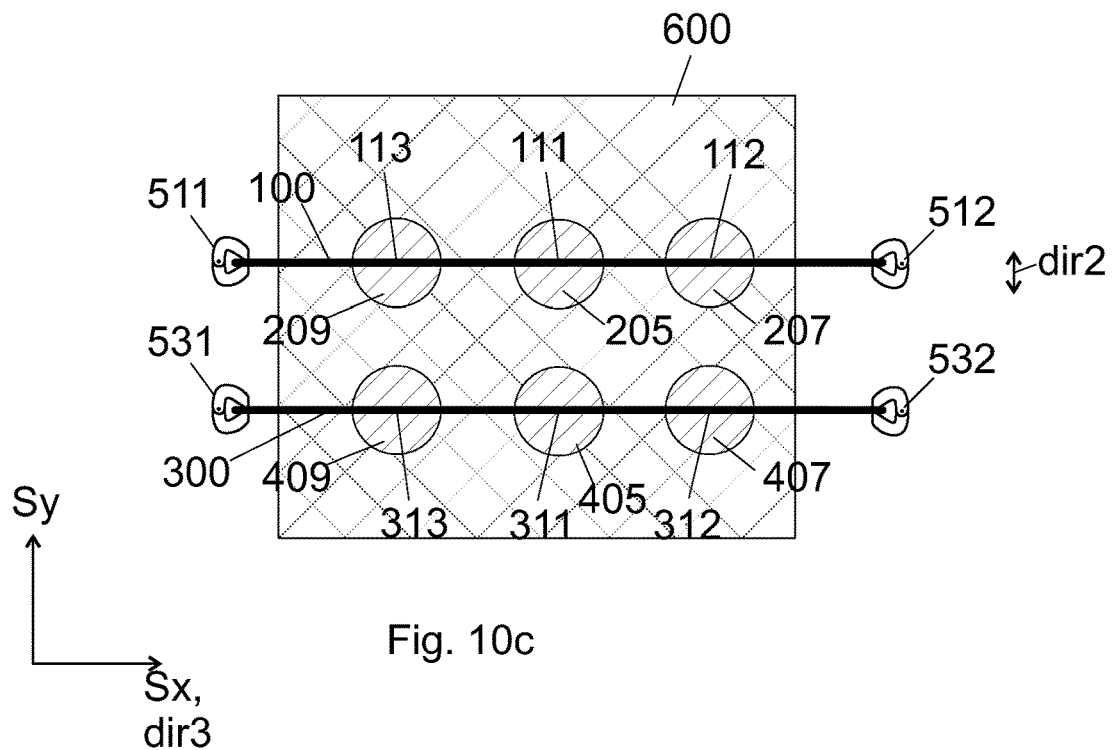
Figure 10D:
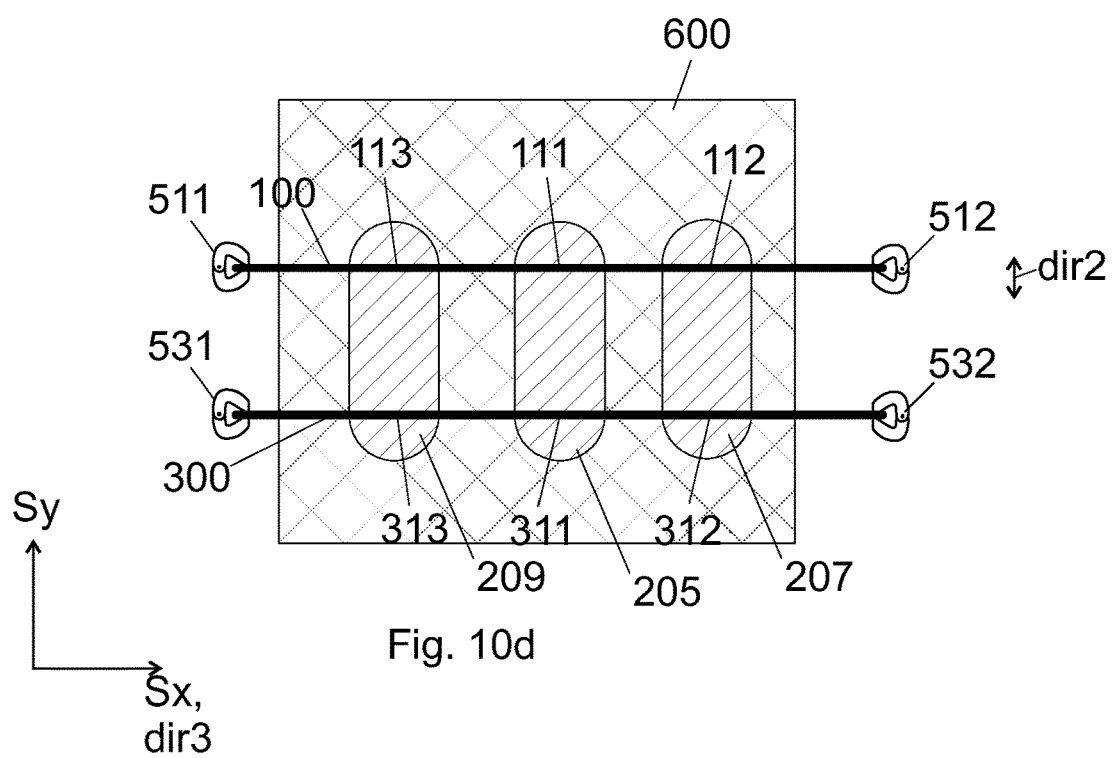
Figure 11A:
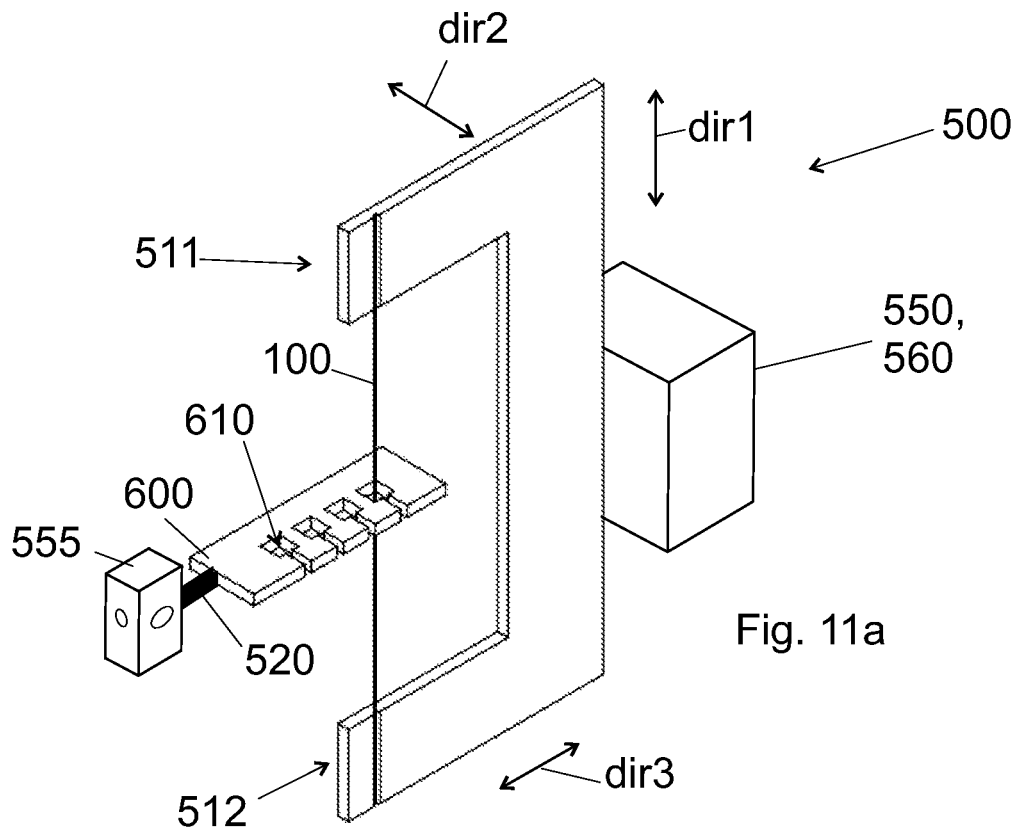
FIG. 11a shows, in a perspective view, a part of an embodiment of a device for forming a droplet or droplets onto a fibre.

FIGS. 10a, 10c, and 10d indicate various possibilities for arranging parts of a primary fibre 100 and parts of a secondary fibre 300 into reserves (205, 207, 209, 405, 407, 409). As indicated above, the reserves 405, 407, 409 may comprise second polymer based material 400 (or they may comprise the same polymer based material 200), while the reserves 205, 207, 209 comprise the polymer based material 200.

During the first primary period of time $T_{1,1}$, the secondary fibre 300 extends through the reserve (205, 207, 209, 405, 407, 409) and on both sides of the reserve (205, 207, 209, 405, 407, 409). Moreover, the secondary fibre 300 and/or the reserve (205, 207, 405) of the liquid or viscous polymer based material (400, 200) surrounding the secondary fibre 300 are moved relative to each other. Thereby a first part 311 of the secondary fibre 300 moves out from the reserve 405 (or 205, 207, 209, 407, 409) of the liquid or viscous polymer based material (400, 200) surrounding the secondary fibre 300 with the first primary velocity $v_{1,1}$. In this way, a first secondary layer 411 of the liquid or viscous polymer based material (400, 200) surrounding the secondary fibre 300 is formed onto the first part 311 of the secondary fibre 300. Also in this case, the secondary fibre 300 can be moved in the longitudinal direction, as indicated e.g. in FIGS. 5a to 5f or is the transversal direction, as indicated in FIGS. 10a, 10c, and 10d.

Moreover, during the first secondary period of time $T_{1,2}$, the first secondary layer 411 of the liquid or viscous polymer based material (400, 200) surrounding the secondary fibre 300 is allowed to form a first secondary droplet 351 onto the secondary fibre 300 such that the secondary fibre 300 extends through the first secondary droplet 351 and on both sides of the first secondary droplet 351. The secondary droplet is allowed to form by [i] holding still the secondary fibre 300 relative to the reserve (205, 207, 205) of the liquid or viscous polymer based material (400, 200) surrounding the secondary fibre 300 or [ii] moving the secondary fibre 300 and/or the reserve (205, 207, 205) of the liquid or viscous polymer based material (400, 200) surrounding the secondary fibre 300 relative to each other with the first secondary velocity $v_{1,2}$ that is less than the first primary velocity $v_{1,1}$.

Thereafter, the first secondary droplet 351 may be solidified or allowed to solidify to form a first secondary solid droplet 361.

Other secondary droplets can also be formed on the secondary fibre 300 as indicated in FIG. 5a to 5f or 10a, 10c, or 10d. In short, the other droplets can be made by applying the method described above for the primary fibre 100 for the secondary fibre 300.

When the size of the reservoir is small, as in the embodiments of FIGS. 2 to 6, the primary fibre 100 is focused to penetrate the reservoir or reservoirs. In a similar manner the secondary fibre 300 may be so focused. As indicated above, during the first primary period of time $T_{1,1}$, the primary fibre 100 is moved relative to the reservoir 205 in a first direction dir1 (see e.g. FIG. 11a). However, before the first primary period of time $T_{1,1}$ the primary fibre 100 has been arranged to penetrate the reservoir 205 and extend on both sides thereof. In order to arrange the primary fibre 100 in this way, the primary fibre 100 is typically moved relative to the reservoir at least in a second direction dir2 that is perpendicular to the first direction dir1. The primary fibre 100 may also be moved relative to the reservoir in a third direction dir3 that is perpendicular to the first direction dir1 and the second direction dir2. For example, in the embodiment of FIG. 11a, the primary fibre 100 is arranged to penetrate the reservoir 205 and extend on both sides thereof by moving the primary fibre in a second direction dir2 and a third direction dir3, that are perpendicular to the first direction dir1. Also in the embodiment of FIG. 11a, the fibre 100 could be moved in also in the first direction dir1, if needed. Moreover, when the droplets are made, the fibre 100 is moved in the first direction dir1.

In the embodiment of FIG. 10a, the primary fibre 100 is arranged to penetrate the reservoir 205 and extend on both sides thereof by moving the primary fibre 100 in the first direction and in a second direction dir2 that is perpendicular to the first direction dir1 In FIG. 10a, the first direction dir1 would be perpendicular to the plane of paper (not shown). Also in the embodiment of FIG. 10a, the fibre 100 could be moved in also in the third direction dir3, if needed. Moreover, when droplets are formed, the fibre 100 is moved in the first direction dir1.

As indicated by these examples, in an embodiment, a part of the primary fibre 100 is arranged into the reserve 205 by moving the primary fibre 100 in a direction that has a component that is perpendicular to the direction of the first primary velocity $v_{1,1}$. In an embodiment, a part of the primary fibre 100 is arranged into the reserve 205 by moving the primary fibre 100 in a direction that has a first component that is perpendicular to the direction of the first primary velocity $v_{1,1}$ and a second component that is perpendicular to both the first component and the direction of the first primary velocity $v_{1,1}$.

Preferably, the method is applied using a device 500 for forming at least a first primary solid droplet 161 onto a primary fibre 100. FIGS. 9a-10b show embodiments of such a device. Referring to these figures, an embodiment of such a device comprises a first holder 511, i.e. a first primary fibre holder 511, configured to hold the primary fibre 100 from a first point P1; and a second holder 520, i.e. a substrate holder 520, configured to hold a substrate 600. As indicated above, the substrate 600 is configured to hold the liquid or viscous polymer based material 200, whereby the liquid or viscous polymer based material 200 held by the substrate 600 forms the reserve 205. The substrate 600 may be a replaceable part, and is not necessarily part of the device at least when the device is sold. However, in use of the device 500, a substrate 600 may be needed. An embodiment of the device 500 comprises the substrate 600. As indicated above, preferably in such a case, the substrate 600 limits an aperture 610 or a slit 612 for receiving the liquid or viscous polymer based material 200; or it may comprise blind holes 602 for receiving the material. Moreover in such a case, preferably, the first primary fibre holder 511 and the substrate 600 are arranged relative to each other in such a way that a straight primary fibre 100 held by the first primary fibre holder 511 can penetrate the reserve 205. For example, the straight primary fibre 100 held by the first primary fibre holder 511 may penetrate the aperture 610 or the slit 612 of the substrate 600 (see FIG. 9*b*). For example, the straight primary fibre 100 held by the first primary fibre holder 511 may run over a hole 602 of the substrate 600 in a close proximity, such as at most 500 μm above the surface of the substrate 600 (see FIG. 9*a*).

The device 500 further comprises an actuator arrangement 550 configured to move the first primary fibre holder 511 relative to the substrate holder 520. In the figures, an actuator 550*a* is configured to move the primary fire 100 relative to a ground and relative to the material 200. In the figures, an actuator 550*b* is configured to move the material 200 relative to a ground and relative primary fibre 100. The actuator arrangement 550 may comprise at least one of such actuators 550*a*, 550*b*.

The device further comprises a control unit 560 configured to control the actuator 550. The control unit 560 and the actuator arrangement 550 may form a single entity. The control unit 560 and the actuator arrangement 550 are, in combination, configured
- to move the first primary fibre holder 511 relative to the substrate holder 520 with a first primary velocity $v_{1,1}$ during the first primary period of time $T_{1,1}$ and
- during a first secondary period of time $T_{1,2}$ to
  - hold still the first primary fibre holder 511 relative to the substrate holder 520 or
  - move the first primary fibre holder 511 relative to the substrate holder 520 with a first secondary velocity $v_{1,2}$ that is less than the first primary velocity $v_{1,1}$.

In this way, after arranging the primary fibre 100 to the first primary fibre holder 511 and arranging a substrate 600 holding the liquid or viscous polymer based material 200 to the a substrate holder 520, the device 500 may automatically perform the method disclosed above. Moreover, it is possible also to arrange only the substrate 600 without the material 200 to the substrate holder 520, and the device 500 may be configured to apply the liquid or viscous polymer based material 200 to the substrate 600. For example, the device 500 may comprise an injector 570 for injecting liquid or viscous polymer based material 200 onto the substrate 600 or into an aperture 610 or a slit 612 of the substrate 600. As indicated above, preferably, the substrate 600 comprises electrically conductive material. For similar reasons, in an embodiment, the substrate holder 520 comprises material that has an electrical resistivity of at most 0.1 Ωm at a temperature of 20° C. In an embodiment, both the substrate holder 520 and the substrate 600 comprise material that has an electrical resistivity of at most 0.1 Ωm at a temperature of 20° C.

Referring to FIG. 11*a*, as indicated above, in order to form a droplet, the actuator arrangement 550 is configured to move the first primary fibre holder 511 relative to the substrate holder 520 in a first direction dir1 that is parallel to the first primary velocity $v_{1,1}$. In order to focus the fibre 100 relative to the reservoir, as indicated above, the device 500 comprises also a focusing apparatus 555 configured to move the first primary fibre holder 511 relative to the substrate holder 520 in a second direction dir2 having a component that is perpendicular to the first direction dir1. Preferably the focusing apparatus 555 is also configured to move the first primary fibre holder 511 relative to the substrate holder 520 in a third direction dir3 having a component that is perpendicular to the first direction dir1 and the second direction dir2. The apparatus 555 may be a part of the actuator arrangement 550, whereby the focusing of the fibre to the reserve 205 can be automated. However, as indicated in FIG. 11*a*, the apparatus 555 may be separate from the actuator arrangement 550, e.g. the apparatus 555 may be a manual apparatus.

In a preferable embodiment, the control unit 560 and the actuator arrangement 550 are, in combination, configured to form also a second droplet 152 onto the primary fibre 100. As indicated in FIGS. 4*a* to 4*c*, 8*d*, and 10*a*, when the fibre 100 (or fibres 100, 300) is moved in the transversal direction, this can be achieved by suitably size and number of reserves. As indicated above in connection with the method wherein the fibre(s) is/are moved in the longitudinal direction, in such an embodiment of the device 500, the control unit 560 and the actuator 550 are, in combination, configured
- to move the first primary fibre holder 511 relative to the substrate holder 520 with a second primary velocity $v_{2,1}$ during a second primary period of time $T_{2,1}$ and
- during a second secondary period of time $T_{2,2}$ to
  - hold still the first primary fibre holder 511 relative to the substrate holder 520 or
  - move the first primary fibre holder 511 relative to the substrate holder 520 with a second secondary velocity $v_{2,2}$ that is less than the second primary velocity $v_{2,1}$.

Referring to FIGS. 9*a* to 10*b*, preferably the primary fibre 100 is held from two points P1 and P2, such as from both ends 102, 104 while forming the droplets. This has the effect that the primary fibre 100 remains substantially straight, whereby the process can be more easily controlled. In such an embodiment, the first primary fibre holder 511 is configured to hold a primary fibre 100 from a first point P1, such as a first end 102 of the primary fibre 100. Moreover, the device 500 comprises a further holder 512, i.e. a second primary fibre holder 512, configured to hold the primary fibre 100 from a second point P2, such as a second end 104 of the primary fibre 100. The second end 104 is opposite to the first end 102. As indicated in FIGS. 9*a* to 10*b*, the distance between the first primary fibre holder 511 and the second primary fibre holder 512 should remain constant during the process of manufacturing the droplets 151, 152, 153 in order not to strain or deflect the primary fibre 100. Therefore, in an embodiment, the control unit 560 and the actuator arrangement 550 are, in combination, configured to move the second primary fibre holder 512 relative to the secondary holder 520 with the first primary velocity $v_{1,1}$ during the first primary period of time $T_{1,1}$. Moreover, in an embodiment, the control unit 560 and the actuator arrangement 550 are, in combination, configured to move the second primary fibre holder 512 relative to the secondary holder 520 with the first secondary velocity $v_{1,2}$ during the first secondary period of time $T_{1,2}$.

In an embodiment, the first primary holder 511 is configured to hold a primary fibre 100 having a width (w1, w2) of from 1 μm to 1 mm, such as from 5 μm to 100 μm. The first primary holder 511 may be configured to hold a primary fibre 100 having a diameter or an equivalent diameter of from 1 μm to 1 mm, such as from 5 μm to 100 μm. In an embodiment, first primary holder 511 is configured to hold a fibre having a width w1, w2 or an equivalent diameter or a diameter as discussed above in connection with the method.

Referring to FIGS. 10a and 10b, preferably the device 500 is configured to form droplets onto at least two fibres 100, 300. Such an embodiment comprises a further holder 531, i.e. a first secondary fibre holder 531, configured to hold a secondary fibre 300. What has been said above about the width(s) of the primary fibre 100 to be held by the first primary holder 511 applies as well to the width(s) of the secondary fibre 300 to be held by the first secondary fibre holder 531 and how large a secondary fibre 300 the first secondary fibre holder 531 is configured to hold.

In such an embodiment, the control unit 560 and the actuator arrangement 550 are, in combination, configured
to move also the first secondary fibre holder 531 relative to the substrate holder 520 with the first primary velocity $v_{1,1}$ during the first primary period of time $T_{1,1}$ and
during the first secondary period of time $T_{1,2}$, to
hold still the first secondary fibre holder 531 relative to the substrate holder 520 or
move the first secondary fibre holder 531 relative to the substrate holder 520 with a first secondary velocity $v_{1,2}$ that is less than the first primary velocity $v_{1,1}$.

As indicated in the figures, in an embodiment, the control unit 560 and the actuator arrangement 550 are, in combination, configured, during the first secondary period of time $T_{1,2}$, to
hold still both the first primary fibre holder 511 and the first secondary fibre holder 531 relative to the substrate holder 520 or
move the both the first primary fibre holder 511 and the first secondary fibre holder 531 relative to the substrate holder 520 with a first secondary velocity $v_{1,2}$ that is less than the first primary velocity $v_{1,1}$.

Referring to FIG. 10b, an embodiment of the device 500 comprises a further holder 532, i.e. a second secondary fibre holder 532. The second secondary fibre holder 532 is configured to hold the secondary fibre 300 from a second point of the secondary fibre, e.g. a second end of the secondary fibre 300. Moreover, in this embodiment, the first secondary fibre holder 531 is configured to hold the secondary fibre 300 from a first point of the secondary fibre, e.g. a first end of the secondary fibre 300, the first end being opposite to the second end.

An embodiment of the device 500 comprises a solidifier 580 (see FIG. 10b) configured to solidify a droplet (151, 152) to form a solid droplet (161, 162). The solidifier 580 may comprise at least one of
a cooler for cooling the droplet or the droplets 151, 152, 153, e.g. in order to solidify thermoplastic material 200,
a heater for heating the droplet or the droplets 151, 152, 153, e.g. in order to cure thermoset material 200, and
an UV source for exposing the droplet or the droplets 151, 152, 153 to UV radiation, e.g. in order to cure thermoset material 200.

An embodiment of the device 500 comprises a heater 522 (see FIG. 9a). The purpose of the heater may be to keep some thermoplastic material 200 in liquid or viscous form on a substrate 600. The heater 522 may be configured to heat at least one of [i] the liquid or viscous polymer based material 200, [ii] the substrate 600, and [iii] the substrate holder 520.

In an embodiment, the liquid or viscous polymer based material 200 is heated via the substrate 600. Therefore, in an embodiment, the substrate is made of thermally conducting material. In an embodiment, the thermal conductivity of the material of the substrate 600 is at least 1 W/(mK) at 20° C., preferably at least 10 W/(mK) at 20° C. In an embodiment, the thermal conductivity of the material of the substrate 600 is at least 1 W/(mK) at 20° C. or at least 10 W/(mK) at 20° C., and the device 500 comprises a heater 522 configured to heat the substrate 600 or the substrate holder 520.

Referring to FIGS. 2a to 2i and 4a to 4c, preferably the device 500 is configured to form at least three droplets to the fibre 100 or the fibres 100, 300 attached to the holder(s) of the device 500. In such a case wherein the fibre is moved in the longitudinal direction, the control unit 560 and the actuator arrangement 550 are, in combination, configured
to move the first primary holder 511 relative to the secondary holder 520 with the third primary velocity $v_{3,1}$ during the third primary period of time $T_{3,1}$ and
during the third secondary period of time $T_{3,2}$, to
hold still the first primary holder 511 relative to the secondary holder 520 or
move the first primary holder 511 relative to the secondary holder 520 with a third secondary velocity $v_{3,2}$ that is less than the third primary velocity $v_{3,1}$.

As indicated above, when the device 500 comprises the first secondary fibre holder 531, the control unit 560 and the actuator arrangement 550 may be configured to move the first secondary fibre holder 531 only simultaneously and only by the same velocity as the first primary fibre holder 511.

Moreover, in some embodiments, the control unit 560 and the actuator arrangement 550 are, in combination, configured in such a way that
the duration of the first primary period of time $T_{1,1}$ has a value as disclosed above in connection with the method for the duration of the first primary period of time $T_{1,1}$,
the aforementioned first primary velocity $v_{1,1}$ has a value as disclosed above in connection with the method for first primary velocity $v_{1,1}$,
the duration of the first secondary period of time $T_{1,2}$ has a value as disclosed above in connection with the method for the duration of the first secondary period of time $T_{1,2}$, and/or
the aforementioned first secondary velocity $v_{1,2}$ has a value as disclosed above in connection with the method for first secondary velocity $v_{1,2}$.

Moreover, in an embodiment, at least one of these values is selected in such a way that
the separation $d_{12}$ between two neighbouring droplets on a fibre is within the limits discussed above,
the separation $d_1$ between a droplet 151 and a closest reservoir 205 is within the limits discussed above, and/or
a length $l_{211}$ of the layer 211 (i.e. the length of the first part 111 of the fibre) is in the limits discussed above.

FIG. 11a shows, in a perspective view some parts of a device 500. In addition a fibre 100 (not part of the device 500) and a substrate 600 (not necessarily part of the device 500) have been arranged relative to the device 500 such that the fibre 100 extends through an aperture 610 of the substrate 600. In FIG. 11a, the actuator arrangement 550 and the control unit 560 are arranged as a single entity. The device 500 comprises a first primary fibre holder 511 and a second primary fibre holder 512, in the figure both holders 511, 512 holding an end of the fibre 100. The actuator arrangement 550 is configured to move the holders in a first direction dir1 during the first primary period of time $T_{1,1}$. The substrate holder 520 is connected to a focusing apparatus 555. The focusing apparatus is configured to move the substrate holder 520 in the second and third directions (dir2, dir3), which are perpendicular to the first direction and to each other. In addition, the focusing apparatus 555 is arranged fixed relative to the entity having the actuator arrangement 550 and the control unit 560. For example, both may be arranged fixed relative to a floor. The control unit 560 and the actuator arrangement 550 are in combination arranged to move the fibre 100 relative to the substrate 600 so as to form droplets onto the fibre 100 as detailed above.

Figure 11B:
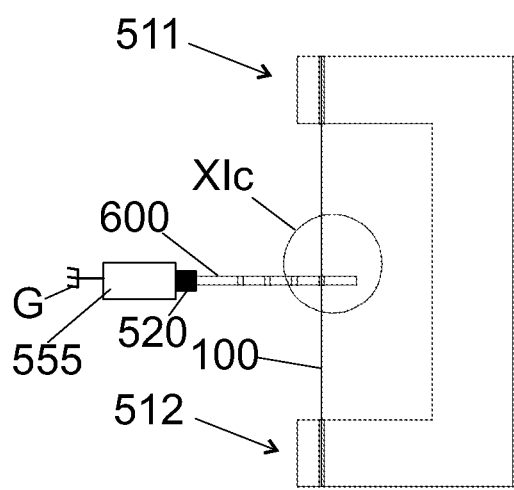
FIG. 11b shows, in a side view, a part of an embodiment of a device for forming a droplet or droplets onto a fibre.

FIG. 11b shows as a side view a part of the device 500 of FIG. 11a. The tilted E sign, indicated by the reference sign G indicates that the position of the focusing apparatus 555 is arranged fixed. As indicated in FIGS. 11a and 11b, a substrate 600 may comprise four apertures 610, whereby droplets could be formed simultaneously onto four fibres. Referring to FIGS. 8d and 10a, a substrate 600 may comprise blind holes 602 for forming the reserves (205, 207, 209, 409, 407). Such a substrate 600 may be used e.g. if the fibre is moved in the transversal direction (see FIGS. 4a to 4c) or the fibre is moved in the longitudinal direction, which is parallel to the plane of the substrate (see FIGS. 6a to 6e).

Figure 11C:
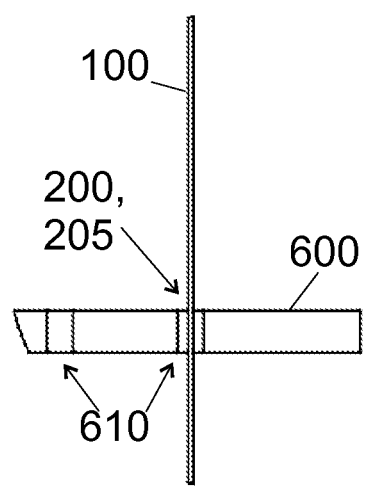
FIG. 11c shows in detail the part XIc of FIG. 11b, FIGS. 12a-12g show a pull out test made using a fibre having three droplets.

The detail indicated by XIc in FIG. 11b is shown in FIG. 11c. In use, the apertures 610 are filled with the liquid or viscous polymer based material 200 (or the other material 400), whereby the filled apertures 610 form the reserves 205, 207, 405 for the material or materials 200, 400.

Figure 12A:
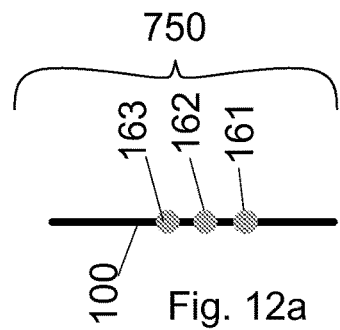

As motivated in the background, such fibres can be used in pull out tests. FIG. 12a shows the fibre 100 equipped with solid droplets 161, 162, 163. When discussing the pull-out test, the fibre having the droplets, such as 161, 162, 163, is referred to as the fibre 750; while only the body 100 of the fibre 750 is referred to as a body 100. For example, the primary fibre 100, before applying the droplets thereon, serves as a body 100 of a fibre 750 having the droplets.

FIGS. 12b to 12g illustrate a pull out test, wherein the fibre 750 equipped with the droplets 161, 162, 163 is used. In a pull out test, the body 100 of the fibre 750 is pulled out from a droplet by a force F. The force acting in between the body of the fibre and the droplet is determined together with a displacement of the body of the fibre relative to the droplet. The displacement may be known and the force measured; or the force may be known and the displacement measured. Furthermore, both the values may be measured. An interfacial shear strength can be obtained by dividing a characterizing force $F_{ch}$ by an area between the body of the fibre and the droplet. The characterizing force $F_{ch}$ may be e.g. an ultimate force or a yield force as determined from the force F as function of the displacement. Furthermore it may be necessary to determine, where the yield/break has occurred (i) at the interface between the fibre body and the droplet (ii) only at the fibre, or (iii) only at the droplet. It is possible that the adhesion strength exceeds the strength of the fibre.

Figure 12B:
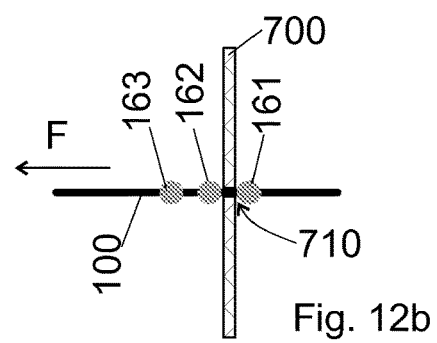
Figure 12C:
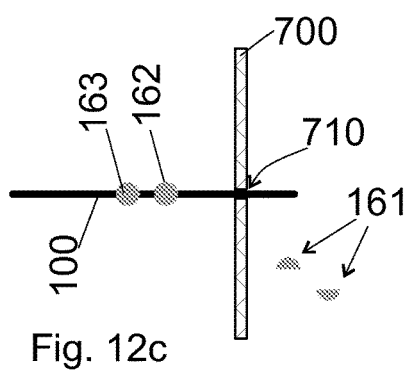

Referring to FIG. 12b, the fibre 750 is first held from one end and from one droplet only, e.g. the first droplet 161. For example, a board 700 equipped with a secondary slit 710 can be used to hold the fibre from a droplet. The width of the secondary slit 710 may be equal to the diameter of the body 100 of the fibre 750, and the body of the fibre 750 may be slid to the secondary slit 710 in such a way that the board 700 limiting the slit 710 limits also the movement of the droplet 161, as indicated in FIG. 12b. The board 700 may be arranged stationary. The body 100 of the fibre 750 is pulled by a force F until the characterizing force $F_{ch}$ is determined. Depending on the test, this may involve determination of a yield point, an ultimate force, or debonding of the fibre body from the droplet. By determining the characterizing force $F_{ch}$, a first value for the interfacial shear strength between the body 100 of the fibre 750 and the material of the droplet 161 is obtained. As indicated in FIG. 12c, the droplet 161 may break. Such a process can be repeated using the other droplets.

Figure 12D:
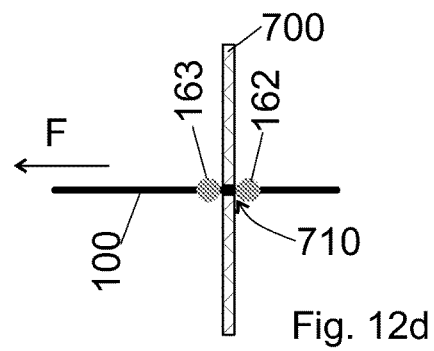
Figure 12E:
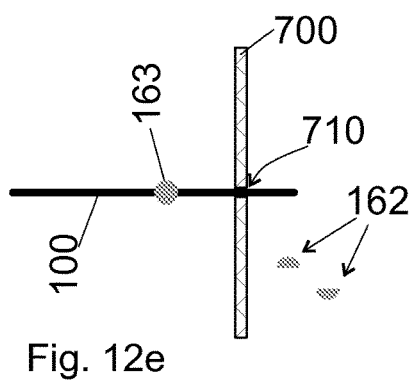
Figure 12F:
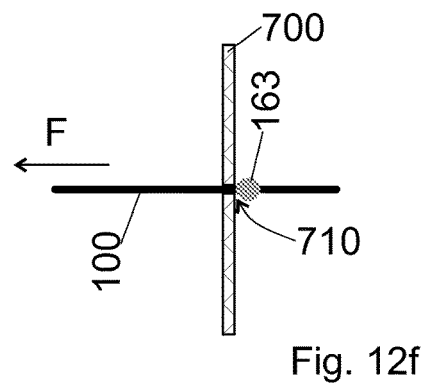
Figure 12G:
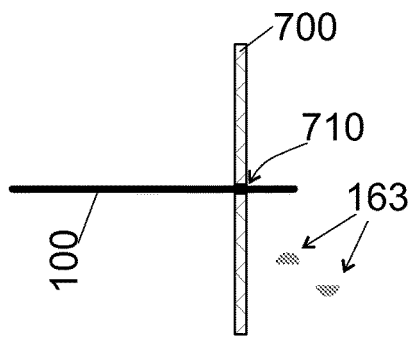

Referring to FIG. 12d, the fibre 750 is thereafter held only from the second droplet 162 in addition to holding it from an end in order to pull the body 100. The body 100 is pulled by a force F until the characterizing force is determined. Thus, a second value for the interfacial shear strength between the body 100 and the material of the droplet 162 is obtained. Referring to FIG. 12f, the fibre 750 is thereafter held only the third droplet 163 in addition to holding it from an end in order to pull the body 100. The body 100 is pulled by a force F until the characterizing force is determined Thus, a third value for the adhesion strength between the body 100 of the fibre 750 and the material of the droplet 163 is obtained.

In this way, at least two values for the adhesion strength can be measured using only one fibre 750. As indicated above, three values or at least three values can be measured. As is evident, significantly more droplets can be manufactured onto a single fibre 100 (not equipped with droplets, thus serving as a body 100), whereby significantly more values for the adhesion strength can be measured using only one fibre 750 equipped with droplets.

An embodiment of the pull out test comprises
arranging available a fibre 750 comprising a body 100 and at least a first solid droplet 161 and a second solid droplet 162,
pulling the body of the fibre 100 by holding the fibre 750 from the first solid droplet 161, and
determining
a force F acting in between the body 100 of the fibre 750 and the first solid droplet 161 and
a displacement of the body 100 of the fibre 750 relative to the first solid droplet 161.

An embodiment of the pull out test further comprises
pulling the body of the fibre 100 by holding the fibre 750 from the second solid droplet 162, and
determining
a force F acting in between the body 100 of the fibre 750 and the second solid droplet 162 and
a displacement of the body 100 of the fibre 750 relative to the second solid droplet 162.

In an embodiment, the fibre 750 further comprises a third solid droplet 163 and the embodiment of the pull out test comprises
pulling the body of the fibre 100 by holding the fibre 750 from the third solid droplet 163, and
determining
a force F acting in between the body 100 of the fibre 750 and the third solid droplet 163 and
a displacement of the body 100 of the fibre 750 relative to the third solid droplet 163.

Experimental

Droplets 151, 152, 153 were made onto a fibre 100 by pulling the fibre 100 in the longitudinal direction from the reserve 205.

Polymer based liquid 200 was formed by mixing the resin EPON 828 and the hardener JEFFAMINE D230. As well known, such polymer based liquid 200 will spontaneously harden to form thermoset polymer. The polymer based liquid 200 was injected to an aperture 610 of a substrate 600, as indicated in FIG. 9b, to form a reserve 205. The viscosity of the polymer based liquid 200 was 347 mPas, as measured according to the standard EN ISO 2555:1999 at the temperature 23° C., which was also the temperature of the reserve 205.

A glass fibre 100 having a diameter of 17 μm was arranged to penetrate the reserve 205 as indicated in FIG. 9*b*. The fibre 100 was manufactured by Jushi Group Co. Ltd. The model of the glass fibre was Jushi E6CR-2400-320.

The fibre 100 was pulled out from the reserve 205 in a longitudinal direction as in FIG. 9*b*. The first, second, third, etc. primary velocities $v_{i,1}$ (i=1, 2, 3, . . . ) were equal and 10 mm/s. After the primary periods of time, the fibre 100 was moved in the longitudinal direction with a velocity of 0.1 mm/s. Therefore, the first, second, third, etc. secondary velocities $v_{i,2}$ (i=1, 2, 3, . . . ) were equal and 0.1 mm/s. This was done in order to generate a gap in between the droplets.

Droplets were formed on six fibre samples. For each sample, a constant stoke length was used. In other words, the stroke length is the duration of a primary period of time $T_{i,1}$ multiplied by the corresponding the primary velocity $v_{i,1}$ (herein i is 1, 2, 3, etc.). For each sample, all the primary velocities were equal and all the primary periods of time were equally long. Thus the stoke length was the same for all droplets is a sample.

The duration of the first, second, third, etc. primary periods of time $T_{i,1}$ was 10 ms for a first fibre sample, 15 ms for a second fibre sample, 20 ms for a third fibre sample, 25 ms for a fourth fibre sample, 30 ms for a fifth fibre sample, 35 ms for a sixth fibre sample, and 40 ms for a seventh fibre sample. In this way, for different fibre samples, from 100 μm to 400 μm of the fibre 100 was pulled out from the reserve 205 during the primary periods of time $T_{i,1}$. In every case, the first, second third, etc. primary layer (211, 212, 213, . . . ) spontaneously formed only one droplet (151, 152, 153, . . . ).

Figure 13A:
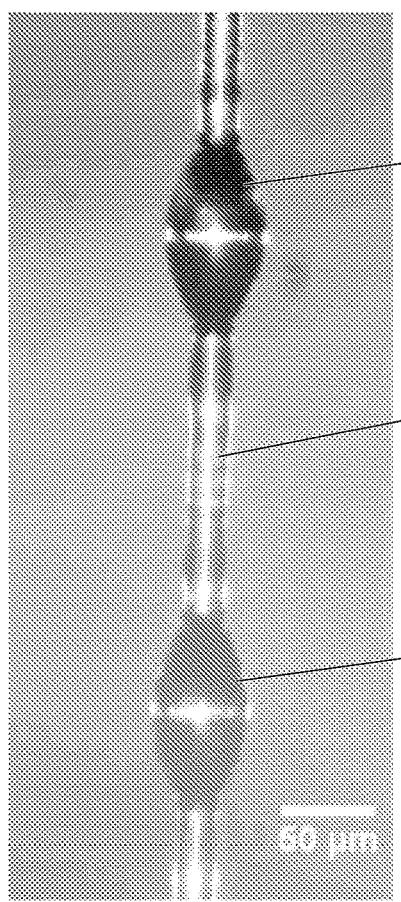
FIGS. 13a and 13b show photographs of droplets formed by an embodiment of the method.
Figure 13B:
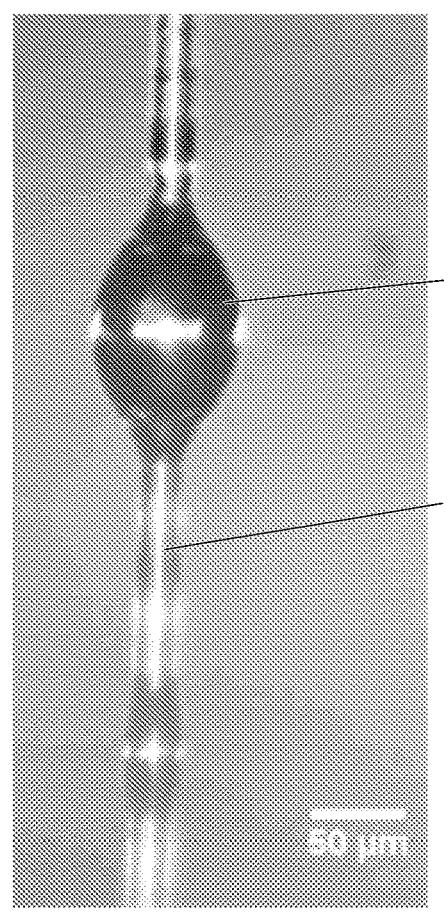

FIGS. 13*a* and 13*b* show images of three droplets, of which two are on a first fibre and one is on a second fibre. The length scale 50 μm has been included in these figures. The droplets of FIG. 13*a* are smaller, because a smaller stoke length was used therein.

Figure 14B:
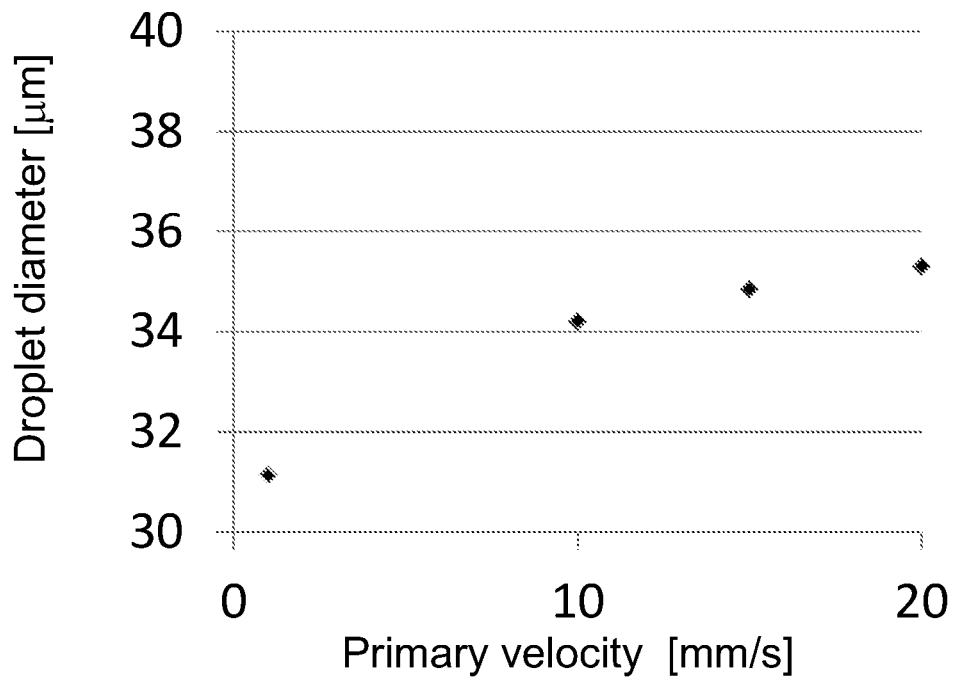
FIG. 14b shows the diameter of the droplet as a function primary velocity (using a constant stoke length).
Figure 14A:
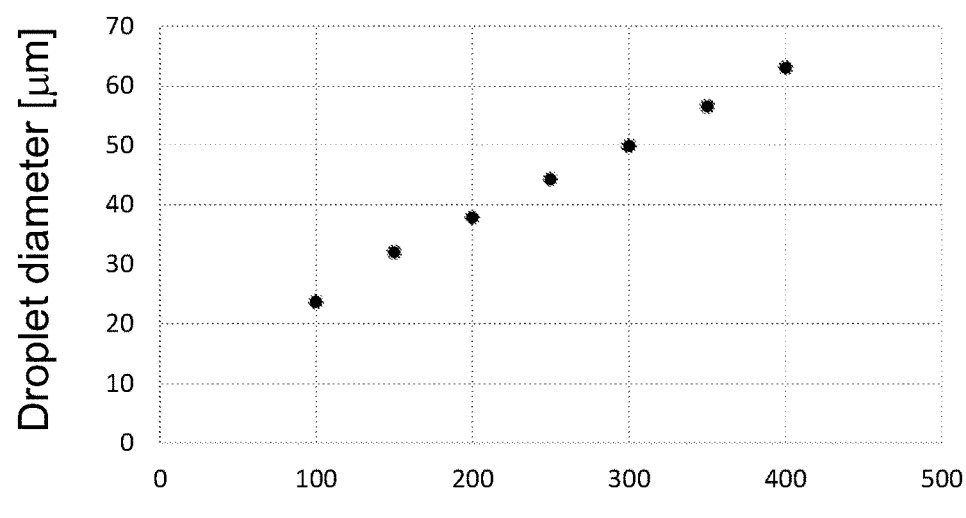
FIG. 14a shows the diameter of the droplet as a function of a stroke length (using a constant primary velocity)

FIG. 14*a* indicates the average diameter of the droplets thus formed as function of the stroke length. As indicated above, the stroke length is substantially equal to the length of the layer 211, 212, 213. As seen from FIG. 14*a*, the diameter of the droplet ("droplet diameter") was from 23 μm to 65 μm. Moreover, increasing the length of the primary layer 211, 212, 213 or the stroke length increases the diameter of the droplet.

To test the effect of the primary velocity $v_{i,1}$ alone, the same materials were used to form droplets such that the primary velocity $v_{i,1}$ and the duration of the primary periods of time $T_{i,1}$ (i=1, 2, 3, . . . ) were varied in such a way that the stoke length was constant. The stroke length was selected to be 260 μm; and the primary velocity $v_{i,1}$ was 1 mm/s, 10 mm/s, 15 mm/s, or 20 mm/s.

FIG. 14*b* indicates the average diameter of the droplets thus formed as function of the first, second, third, . . . etc. primary velocity. As seen therefrom, the diameter of the droplet ("droplet diameter") was from about 31 μm to 36 μm. With a small velocity, the droplet was somewhat smaller, indicating that the for a small primary velocity, the thickness of the primary layer 211, 212, 213 was somewhat smaller than for a higher primary velocity. However, for reasonably large velocities, the dependence of the size of the droplet on the primary velocity was only small.

Test were also performed with a carbon fibre having a diameter of 7 μm. These fibres were manufactured by Torayaca. The model of the carbon fibres was Torayca T300 6K. As for the polymer based material, a composition of EPON 828 and JEFFAMINE D230 was used as above for the glass fibres. Droplets were generated by using two different primary velocities, 3 mm/s and 1.5 mm/s. For both primary velocities, the stroke length was 250 μm. In between the primary periods of time, the fibre was pulled in the longitudinal direction with a secondary velocity of 0.1 mm/s in order to generate a gap in between the droplets. Single droplets for each stoke could be formed. For the primary velocity 3 mm/s, the resulting droplets had a diameter of 23 μm. For the primary velocity 1.5 mm/s, the resulting droplets had a diameter of 14 μm.

The invention claimed is:

1. A method for forming at least one primary droplet onto a primary fiber, the method comprising:
   arranging a part of the primary fiber into a reserve of liquid or viscous polymer-based material such that the primary fiber extends through the reserve and on both sides of the reserve;
   during a first primary period of time after arranging the part of the primary fiber into the reserve of liquid or viscous polymer, moving one or more of the primary fiber and the reserve relative to each other in a direction, the direction having a component that is parallel to the length of the primary fiber such that a first part of the primary fiber moves out from the reserve with a first primary velocity, thereby forming a first primary layer of the liquid or viscous polymer-based material onto the first part of the primary fiber;
   during a first secondary period of time after the first primary period of time, allowing the first primary layer of the liquid or viscous polymer-based material to form a first primary droplet of the at least one primary droplet onto the primary fiber by one of: (i) holding the primary fiber still relative to the reserve, and (ii) moving one or more of the primary fiber and the reserve relative to each other with a first secondary velocity that is less than the first primary velocity;
   selecting one or more of the first primary velocity and the duration of the first primary period of time such that during the first secondary period of time, only one first primary droplet forms onto the primary fiber;
   during a second primary period of time, moving one or more of the primary fiber and the reserve relative to each other such that a second part of the primary fiber moves out from the reserve with a second primary velocity, thereby forming a second primary layer of the liquid or viscous polymer-based material onto the second part of the primary fiber;
   during a second secondary period of time, allowing the second layer of the liquid or viscous polymer-based material to form a second primary droplet of the at least one primary droplet onto the primary fiber by one of: (i) holding the primary fiber still relative to the reserve, and (ii) moving one of the primary fiber and the reserve with a second secondary velocity that is less than the second primary velocity,
   wherein during the first primary period of time, a viscosity of the liquid or viscous polymer-based material is in a range from 250 MPa·s to 50000 MPa·s as measured according to the standard EN ISO 2555:1999,
   the first primary velocity is from 0.5 mm/s to 50 mm/s, and
   during the first primary period of time, the primary fiber is moved relative to the reserve in a direction that is parallel to the length of the primary fiber.

2. The method of claim 1, wherein the reserve of the liquid or viscous polymer-based material is disposed on a substrate.

3. The method of claim 1, wherein the reserve of the liquid or viscous polymer-based material is disposed in an aperture or a slit of a substrate.

4. The method of claim 1, wherein during the first primary period of time, the primary fiber is held from a first point and a second point such that the reserve is disposed in between the first point and the second point.

5. The method of claim 1, wherein an equivalent diameter of the primary fiber is from 1 µm to 500 µm.

6. The method of claim 1, wherein the primary fiber comprises at least one of:
   a metal,
   carbon,
   glass,
   a semi-synthetic material, and
   a synthetic chemical-based material.

7. The method of claim 1, wherein
   a ratio of the length of the primary fiber to an equivalent diameter of the primary fiber is at least 100.

8. The method of claim 7, wherein the ratio is at least 1000.

9. The method of claim 1, wherein the liquid or viscous polymer-based material comprises at least one of:
   uncured thermoset polymer,
   molten thermoplastic polymer, and
   polymer dissolved in a solvent.

10. The method of claim 9, wherein the liquid or viscous polymer-based material comprises resin.

11. The method of claim 1, wherein the liquid or viscous polymer-based material is solidifiable by using external energy.

12. The method of claim 1, wherein
   during the first primary period of time, the viscosity of the liquid or viscous polymer-based material is in the range from 500 MPa·s to 10000 MPa·s as measured according to the standard EN ISO 2555:1999,
   during the first primary period of time, at least some of the liquid or viscous polymer-based material is at a temperature from 4° C. to 400° C. and the viscosity of the liquid or viscous polymer-based material is in the range from 4° C. to 400° C. at the temperature.

13. The method of claim 1, wherein a distance between the first primary droplet and the second primary droplet is at least 10 µm.

14. The method of claim 1, wherein a diameter of the first primary droplet is from 5 µm to 500 µm.

15. The method claim 1, wherein a length of the first primary layer is at least 10 µm.

16. The method of claim 1, wherein the first secondary velocity is at most 10 mm/s.

17. The method of claim 1, wherein a diameter of the first primary droplet is from 2 µm to 500 µm larger than an equivalent diameter of the primary fiber.

18. The method of claim 1, further comprising:
   during a third primary period of time, moving one or more of the primary fiber and the reserve relative to each other such that a third part of the primary fiber moves out from the reserve with a third primary velocity, thereby forming a third primary layer of the liquid or viscous polymer-based material onto the third part of the primary fiber; and
   during a third secondary period of time, allowing the third primary layer of the liquid or viscous polymer-based material to form a third primary droplet onto the primary fiber by one of: (i) holding the primary fiber still relative to the reserve, and moving one or more of the primary fiber and the reserve relative to each other with a third secondary velocity that is less than the third primary velocity.

19. A method for forming at least one primary solid droplet onto a primary fiber, the method comprising:
   forming at least a droplet onto the primary fiber according to the method of claim 1, and
   solidifying the one primary droplet or allowing the one primary droplet to solidify to form a first primary solid droplet.

* * * * *